(12) United States Patent
Kato et al.

(10) Patent No.: US 8,545,359 B2
(45) Date of Patent: Oct. 1, 2013

(54) DRIVE FORCE ADJUSTMENT APPARATUS

(75) Inventors: Tomo Kato, Chiryu (JP); Kaoru Sawase, Anjo (JP); Yuichi Ushiroda, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/722,393

(22) Filed: Mar. 11, 2010

(65) Prior Publication Data
US 2010/0234158 A1 Sep. 16, 2010

(30) Foreign Application Priority Data
Mar. 12, 2009 (JP) .................. P2009-059022

(51) Int. Cl.
*F16H 37/08* (2006.01)
*F16H 48/30* (2012.01)

(52) U.S. Cl.
USPC .......................... 475/204; 475/150

(58) Field of Classification Search
USPC ................ 475/5, 18, 21, 149, 150, 198, 203, 475/204, 205, 221; 180/6.44
See application file for complete search history.

(56) References Cited

U.S. PATENT DOCUMENTS

| 6,056,660 | A | * | 5/2000 | Mimura | 475/205 |
| 7,955,208 | B2 | * | 6/2011 | Kinoshita et al. | 475/150 |
| 2006/0079370 | A1 | | 4/2006 | Kushino | |
| 2007/0123383 | A1 | | 5/2007 | Yokoyama et al. | |
| 2009/0118051 | A1 | * | 5/2009 | Bock et al. | 475/205 |
| 2009/0197727 | A1 | * | 8/2009 | Janson | 475/5 |
| 2010/0234161 | A1 | * | 9/2010 | Kato et al. | 475/205 |

FOREIGN PATENT DOCUMENTS

| JP | 2001-39179 A | 2/2001 |
| JP | 2006-112474 A | 4/2006 |
| JP | 2007-177916 A | 7/2007 |

OTHER PUBLICATIONS

Japanese Office Action issued in Japanese Patent Application No. 2009-059022 on Jul. 31, 2012.

* cited by examiner

*Primary Examiner* — Roger Pang
(74) *Attorney, Agent, or Firm* — Birch, Stewart, Kolasch & Birch, LLP

(57) ABSTRACT

A drive force adjustment apparatus includes a differential gear, a motor, a first gear mechanism and a second gear mechanism. The input element, the first output element, the second output element, the motor input element, the fixed element, and the connecting element are expressed as points I, R, L, M, F and C on a graph, an ordinate of which shows the number of revolutions and a abscissa of which shows relative ratios of the number of revolutions of the elements. Length of L-I is equal to length of R-I, I is located between L and R on a straight line L-R, I is located between F and C on a straight line F-C, and R is located between C and M on a straight line C-M.

1 Claim, 17 Drawing Sheets

DRIVE FORCE ADJUSTMENT APPARATUS

BACKGROUND OF THE INVENTION

1. Field of the Invention

The present invention relates to a drive force adjustment apparatus.

2. Description of the Related Art

A drive force adjustment apparatus of a related art, which adjusts distribution of drive force to the left and right wheels of a vehicle, has been known. In the drive force adjustment apparatus, a drive force adjustment mechanism is provided along with a differential gear between the left and right drive wheels, and a drive force distribution state is controlled by controlling actuation of the drive force adjustment mechanism. Such a configuration has been known as the drive force adjustment mechanism, which is provided with two gear mechanisms for further increasing or further decreasing the velocity of one wheel of the left and right wheels than that of the other wheel and a motor for generating a difference in torque between the left wheel and the right wheel by distributing torque to the left and right wheels. One example of such a related art is disclosed in JP-A-2007-177916.

However, in the drive force adjustment mechanism according to the related art disclosed in JP-A-2007-177916, there may be a case where a carrier supporting planetary gears always rotates in the reverse direction with respect to a case of a differential gear and an output shaft, depending on the number of teeth of respective gears in two gear mechanisms. In this case, there is a problem that agitation resistance in the interior of a casing of the drive force adjustment apparatus increases to resultantly increase the traveling load.

In addition, there may be a case where the reduction ratio of motor torque becomes less than 1, depending on the number of teeth of the respective gears of the two gear mechanisms. In this case, there is a problem that a motor is large-scaled and the weight of the drive force adjustment apparatus increases since a motor which is able to generate a maximum torque greater than a desired difference in torque between the left wheel and the right wheel, must be used.

SUMMARY OF THE INVENTION

It is therefore an object of the invention to provide a drive force adjustment apparatus capable of using a motor that generates a maximum torque smaller than a desired difference in torque between the left wheel and the right wheel.

In order to achieve the object, according to the invention, there is provided a drive force adjustment apparatus comprising:

a differential gear, into which a drive force is input from a drive source, the differential gear configured to absorb a difference in the number of revolutions between two output shafts;

a motor configured to generate a difference in torque between the output shafts, wherein the number of revolutions of the motor is 0 when a vehicle travels straight; and a first gear mechanism and a second gear mechanism, which increase or decrease torque of one of the output shafts by a magnitude and decrease or increase torque of the other of the output shafts by the magnitude, the first gear mechanism including a first rotating element, a second rotating element and a third rotating element, the second gear mechanism including a fourth rotating element, a fifth rotating element and a sixth rotating element, wherein an element that is connected to a rotating element into which torque of the differential gear is input and the fourth rotating element of the second gear mechanism is an input element, a rotating element of one of the output shafts is a first output element, a rotating element of the other of the output shafts is a second output element, and one of the first output element and the second output element is connected to the first rotating element of the first gear mechanism, an element that is connected to the second rotating element of the first gear mechanism and the motor is a motor input element, an element that is connected to the fifth rotating element of the second gear mechanism and a casing is a fixed element, the number of revolutions of which is 0, an element that is connected to the third rotating element of the first gear mechanism and the sixth rotating element of the second gear mechanism is a connecting element, and the input element, the first output element, the second output element, the motor input element, the fixed element, and the connecting element are, respectively, expressed as points I, R, L, M, F and C on a graph, a ordinate of which shows the number of revolutions and a abscissa of which shows relative ratios of the number of revolutions of the input element, the first output element, the second output element, the motor input element, the fixed element and the connecting element, wherein in the graph, length of a straight line connecting the point L and the point I is equal to length of a straight line connecting the point R and the point I, the point I is located between the point L and the point R on a straight line connecting the point L and the point R, the point I is located between the point F and the point C on a straight line connecting the point F and the point C, and the point R is located between the point C and the point M on a straight line connecting the point C and the point M, or in the graph, length of a straight line connecting the point L and the point I is equal to length of a straight line connecting the point R and the point I, the point I is located between the point L and the point R on a straight line connecting the point L and the point R, the point L is located between the point M and the point C on a straight line connecting the point M and the point C, and the point I is located between the point C and the point F on a straight line connecting the point C and the point F.

The first gear mechanism may include: a first sun gear, which is the first rotating element, connected to one of the output shafts; a first planetary gear provided around the first sun gear and meshed with the first sun gear; a second planetary gear provided coaxially with the first planetary gear and rotating integrally with the first planetary gear; a first carrier, which is the third rotating element, rotatably and pivotally supporting the first planetary gear and the second planetary gear; and a second sun gear, which is the second rotating element, provided coaxially with the first sun gear, meshed with the second planetary gear and connected to a rotation shaft of the motor. The second gear mechanism may include: a third sun gear, which is the fourth rotating element, connected to a case of the differential gear; a third planetary gear provided around the third sun gear and meshed with the third sun gear; a fourth planetary gear provided coaxially with the third planetary gear and rotating integrally with the third planetary gear; a second carrier, which is the sixth rotating element, rotatably and pivotally supporting the third planetary gear and the fourth planetary gear and formed to be integral with the first carrier; and a fourth sun gear, which is the fifth rotating element, provided coaxially with the third sun gear, meshed with the fourth planetary gear, and fixed on the casing.

The number of teeth of the first sun gear and the number of teeth of the third sun gear may be equal to each other, the number of teeth of the first planetary gear and the number of teeth of the third planetary gear may be equal to each other, the number of teeth of the second sun gear and the number of teeth of the fourth sun gear may be equal to each other, and the number of teeth of the second planetary gear and the number of teeth of the fourth planetary gear may be equal to each other. Ratio of the number of teeth of the first sun gear to the number of teeth of the first planetary gear may be smaller than ratio of the number of teeth of the second sun gear to the number of teeth of the second planetary gear. Ratio of the number of teeth of the third sun gear to the number of teeth of the third planetary gear may be smaller than ratio of the number of teeth of the fourth sun gear to the number of teeth of the fourth planetary gear.

DETAILED DESCRIPTION OF THE INVENTION

Figure 1:
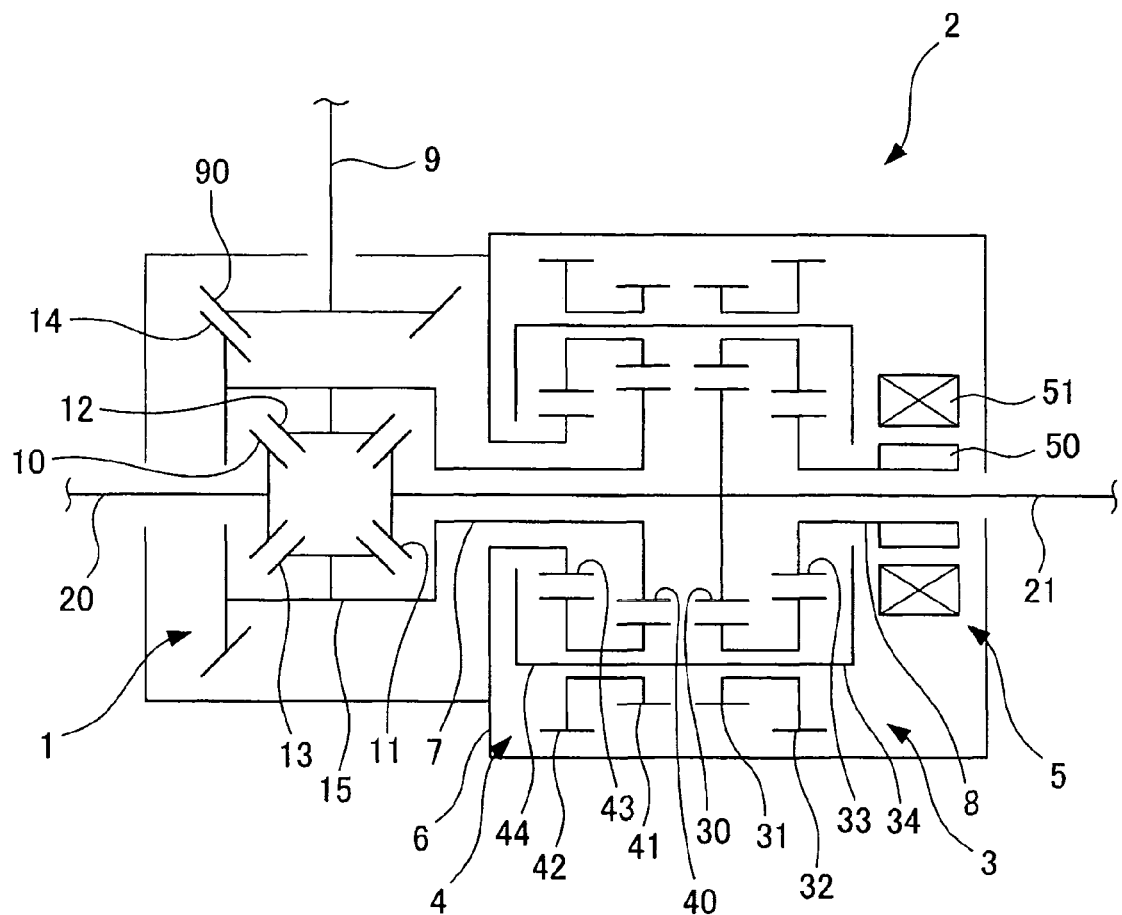
FIG. 1 is a skeleton diagram of a drive force adjustment apparatus according to Embodiment 1.

Hereinafter, a description is given of modes for carrying out a drive force adjustment apparatus according to the present invention with reference to the drawings.

When designing the drive force adjustment apparatus according to the present invention, several examinations were first carried out with respect to structures and characteristics of a drive force adjustment apparatus in order to find out how the drive force adjustment apparatus is to be configured. Also, hereinafter, it is assumed that a drive force adjustment apparatus for adjusting the drive forces between the left and right wheels of a vehicle is described as an example for reference. Hereinafter, details of the examinations will be described.

1. Consideration of Structure of Drive Force Adjustment Apparatus in the Present Examination 1.1. Design Specification of the Drive Force Adjustment Apparatus in the Present Examination The design specification of the drive force adjustment apparatus in the present examination is defined as follows:

Design specification 1: Input torque is equally distributed to the left and right wheels, and a differential gear is provided which permits differential rotations between the left wheel and the right wheel.

Design specification 2: An electric motor is adopted as an actuator for generating a difference in torque between the left wheel and the right wheel.

Design specification 3: The number of electric motors incorporated is 1 unit.

Design specification 4: The number of revolutions of the electric motor is 0 when traveling straight.

Design specification 5: By applying toque by the electric motor, the torque of the right wheel is increased or decreased, and the torque of the same magnitude is decreased or increased at the left wheel.

1.2. Consideration of Configuration

A configuration of the drive force adjustment apparatus in the present examination is taken into consideration, using the structure, which meets the above-described design specifications, as an example.

1.2.1. Composition of Rotating Elements

Figure 9:
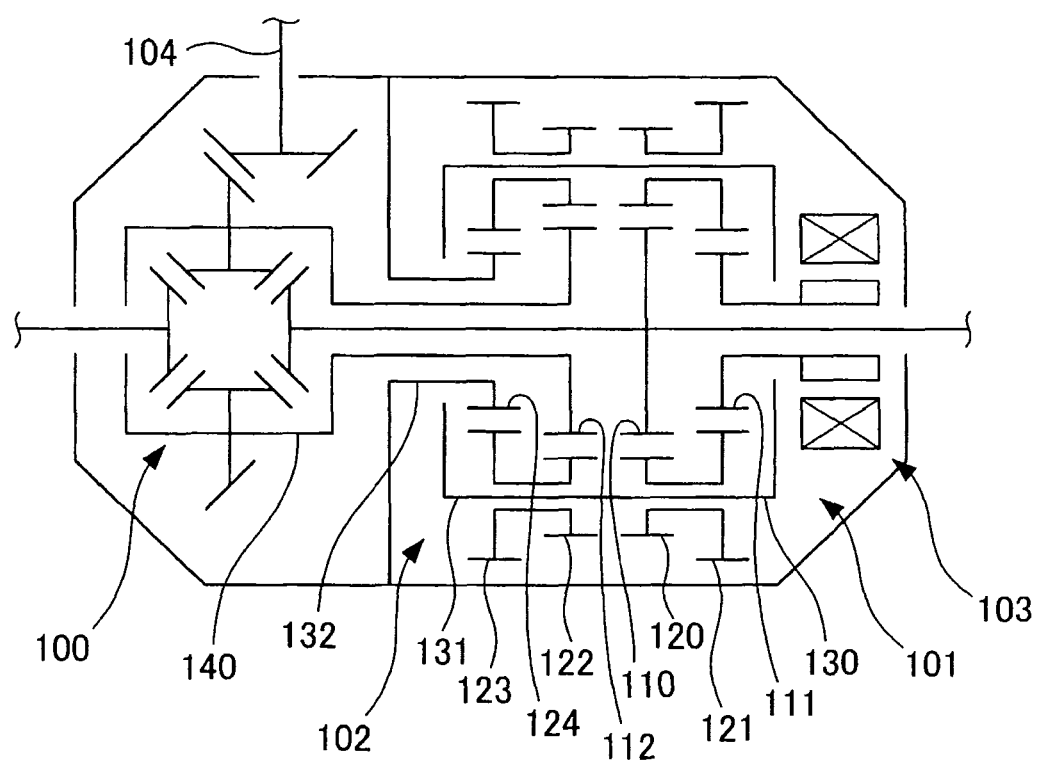
FIG. 9 is a structural view of a structural example of a drive force adjustment apparatus in the present examination.

FIG. 9 is a structural view of a structural example of a drive force adjustment apparatus in the present examination.

As shown in FIG. 9, three 3-element gear mechanisms having two rotational degrees of freedom are used in the structural example of the drive force adjustment apparatus in the present examination. It is assumed that the left side gear mechanism is a differential gear 100, and the right side of the two gear mechanisms located at the right side of the differential gear 100 is the first gear mechanism 101, and the left side thereof is the second gear mechanism 102.

The sun gear having a greater number of teeth of the two sun gears of the first gear mechanism 101 is the first sun gear 110, the sun gear having a fewer number of teeth thereof is the second sun gear 111. And, the sun gear having more teeth of the two sun gears of the second gear mechanism 102 is the third sun gear 112, and the sun gear having a fewer number of teeth thereof is the fourth sun gear 124.

Planetary gears meshed with the first sun gear 110, the second sun gear 111, the third sun gear 112, and the fourth sun gear 124 are, respectively, the first planetary gear 120, the second planetary gear 121, the third planetary gear 122 and the fourth planetary gear 123. Also, the number of teeth of the first planetary gear 120 is equal to that of the third planetary gear 122, and the number of teeth of the second planetary gear 121 is equal to that of the fourth planetary gear 123.

A carrier of the first planetary gear 120 and the second planetary gear 121 is the first carrier 130, and a carrier of the third planetary gear 122 and the fourth planetary gear 123 is the second carrier 131.

Here, it is assumed that a rotating element into which torque is input from a propeller shaft 104 of the differential gear 100 is an input element I, a rotating element at the right wheel side is a right wheel output element R, a rotating element at the left wheel side is a left wheel output element L.

The first sun gear 110 is connected to the right wheel output element R. The second sun gear 111 is connected to the motor 103. It is assumed that this rotating element is a motor input element M.

The third sun gear 112 is connected to the input element I. The fourth sun gear 124 is connected to the casing 132, and the number of revolutions thereof becomes 0. It is assumed that this rotating element is a fixed element F.

The first carrier 130 is connected to the second carrier 131. It is assumed that this rotating element is a connecting element C.

1.2.2. Mechanism Analysis by the Velocity Diagram

In the velocity diagrams, the respective rotating elements are depicted as points. The ordinate shows the number of revolutions of the respective rotating elements, and the abscissa shows the relative ratio of the number of revolutions with respect to the respective rotating elements. The three elements of the gear mechanism are connected by straight lines. Where the number of revolutions of rotating elements of the gear mechanism changes, the rotating elements move only in the ordinate direction because the relative ratio of the number of revolutions with respect to the respective rotating elements does not change, and the angles of the straight lines connecting the rotating elements to each other are changed.

Figure 10:
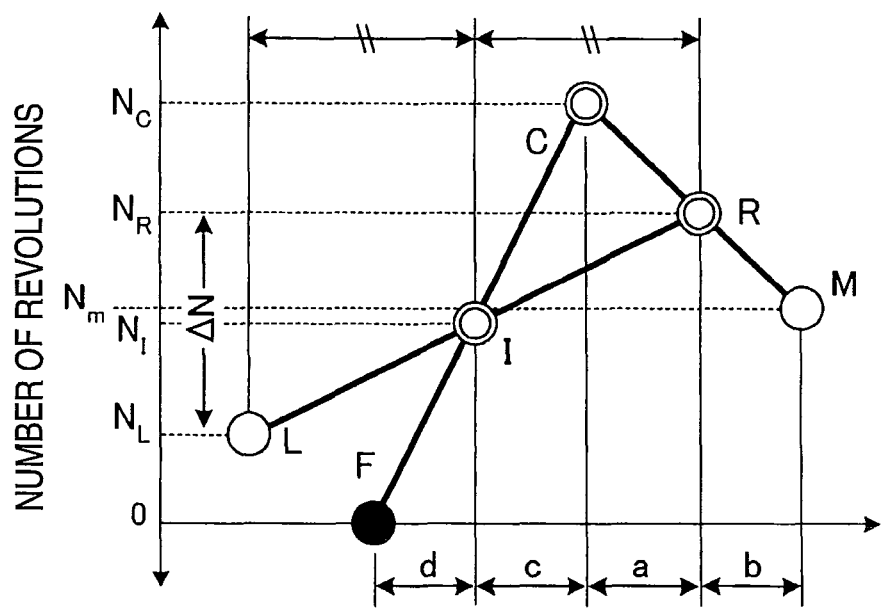
FIG. 10 is a velocity diagram of the structural example of the drive force adjustment apparatus in the present examination.

FIG. 10 is a velocity diagram of the structural example of the drive force adjustment apparatus in the present examination.

As shown in FIG. 10, the velocity diagram of the structural example of the drive force adjustment apparatus in the present examination shows a state where a vehicle turns left at the number $N_I$ of revolutions and a difference $\Delta N$ in the number of revolutions between the left wheel and the right wheel. Therefore, the right wheel output element R is faster than the input element I, and the left wheel output element L is slower than the input element I. Also, in FIG. 10, L-I-R shows the differential gear 100, C-R-M shows the first gear mechanism 101, and F-I-C shows the second gear mechanism 102.

Where a difference in the number of revolutions between the left wheel and the right wheel occurs, the differential gear 100 increases the velocity of one of the left and right wheels in regard to the number $N_I$ of revolutions of the input element I and decreases the velocity of the other. The number of revolutions by which the velocity is increased or decreased is equal to each other. That is, since the relative ratios of the number of revolutions with respect to the input elements I of the right wheel output element R and the left wheel output element L are equal to each other, the length of L-I becomes equal to that of R-I in the velocity diagram.

As shown in FIG. 10, it is assumed that the relative ratios of the number of revolutions of respective elements with respect to the right wheel output element R in the first gear mechanism 101 are a and b, and the relative ratios of the number of revolutions of respective elements with respect to the input element I in the second gear mechanism 102 are c and d. The ratios a, b, c and d of the number of revolutions are defined by using the following expressions adopting the number of teeth of respective gears.

$$a = Z_{P1}/Z_{S1} \quad (1)$$

$$b = Z_{P2}/Z_{S2} - Z_{P1}/Z_{S1} \quad (2)$$

$$c = Z_{P3}/Z_{S3} \quad (3)$$

$$d = Z_{P4}/Z_{S4} - Z_{P3}/Z_{S3} \quad (4)$$

Here, $Z_{S1}$ means the number of teeth of the first sun gear, $Z_{S2}$ means the number of teeth of the second sun gear, $Z_{P1}$ means the number of teeth of the first planetary gear, $Z_{P2}$ means the number of teeth of the second planetary gear, $Z_{S3}$ means the number of teeth of the third sun gear, $Z_{S4}$ means the number of teeth of the fourth sun gear, $Z_{P3}$ means the number of teeth of the third planetary gear, and $Z_{P4}$ means the number of teeth of the fourth planetary gear.

First, the number of revolutions of the respective rotating elements is analyzed.

In the traveling state shown in FIG. 10, the number $N_R$ of revolutions of the right wheel output element R and the number $N_L$ of revolutions of the left wheel output element L may be expressed by the following expressions using the number $N_I$ of revolutions of the input element I and the difference $\Delta N$ in the number of revolutions between the left wheel and the right wheel.

$$N_R = N_I + \Delta N/2 \quad (5)$$

$$N_L = N_I - \Delta N/2 \quad (6)$$

The number of revolutions of the fixed element F of the second gear mechanism 102 is always 0, and the number of revolutions of the input element I is $N_I$. Since the second gear mechanism 102 is of three elements having two rotational degrees of freedom, the number $N_C$ of revolutions of the connecting element C is unitarily determined, and may be expressed by the following expression.

$$N_C = \frac{c+d}{d} \cdot N_I \quad (7)$$

The number $N_R$ of revolutions of the right wheel output element R of the first gear mechanism 101 is determined by the number $N_I$ of revolutions and the difference $\Delta N$ in the number of revolutions between the left wheel and the right wheel, and the number $N_C$ of revolutions of the connecting element C is unitarily determined by the second gear mechanism 102. Since the first gear mechanism 101 is also of three elements having two rotational degrees of freedom, the number $N_m$ of revolutions of the motor input element M is unitarily determined, and may be expressed by the following expression.

$$N_m = N_R - \frac{b}{a}(N_c - N_R) \quad (8)$$

If the expression (8) is arranged by the number $N_R$ of revolutions of the right wheel output element R and the number $N_C$ of revolutions of the connecting element C, the following expression is obtained.

$$N_m = \frac{a+b}{a} \cdot N_R - \frac{b}{a} \cdot N_c \quad (9)$$

In order to delete the number $N_R$ of revolutions and the number $N_C$ of revolutions from the expression (9), the expressions (5) and (7) are substituted in the expression (9), wherein the following expression is obtained.

$$N_m = \frac{ad-bc}{ad} \cdot N_I + \frac{a+b}{2a} \cdot \Delta N \quad (10)$$

Based on the above, in the structural example of the drive force adjustment apparatus in the present examination, the number of revolutions of the right wheel output element R and the left wheel output element L of the connecting element C and the motor input element M are determined by the number $N_I$ of revolutions of the input element I and the difference $\Delta N$ in the number of revolutions between the left wheel and the right wheel. That is, the structure is of five elements having two rotational degrees of freedom.

Here, a condition necessary to make the number $N_m$ of revolutions of the motor input element M into 0 when traveling straight in the design specification 4 of point 1.1 is taken into consideration. When traveling straight, that is, where the difference $\Delta N$ in the number of revolutions between the left wheel and the right wheel is made into 0, in the expression (10) in which the number of revolutions of the motor input element M is expressed, the second term expressed by the product of the difference $\Delta N$ in the number of revolutions between the left wheel and the right wheel by the coefficient becomes 0, and the first term expressed by the product of the number $N_I$ of revolutions by the coefficient is left over. Since $N_I>0$ is brought into traveling, it is necessary that the coefficient of $N_I$ of the first term to meet the design condition is made into 0. The condition is shown by the following expression.

$$\frac{ad-bc}{ad} = 0 \quad (11)$$

If the expression (11) is arranged, the following expression is obtained.

$$\frac{a}{b} = \frac{c}{d} \quad (12)$$

Next, the torque transmitted to the respective rotating elements is analyzed.

In the velocity diagrams, the relationship regarding torque transmitted to the respective rotating elements of the gear mechanism may be analyzed as in the principle of leverage. That is, it can be considered that, in the velocity diagrams, the relative difference in the number of revolutions between torque and each rotating element is the same element as the ratio between a force and a length of a lever rod in the principle of leverage. Therefore, in regard to the relationship regarding torque transmitted to the respective rotating elements, the torque transmitted to the respective rotating elements can be analyzed by solving a balance expression of the total sum of torque and a balance expression of moment.

Figure 11:
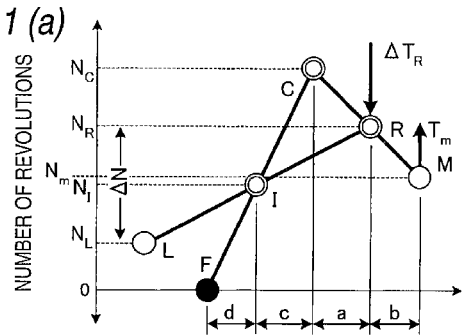
FIG. 11($a$), FIG. 11($b$), FIG. 11($c$) and FIG. 11($d$) are views showing torque operating on respective rotating elements in respective gear mechanisms.
Figure 11:
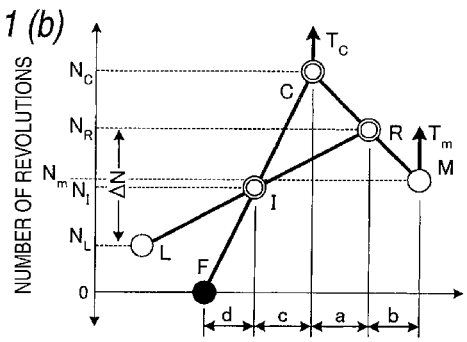
Figure 11:
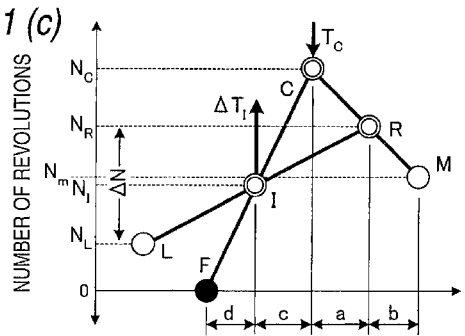
Figure 11:
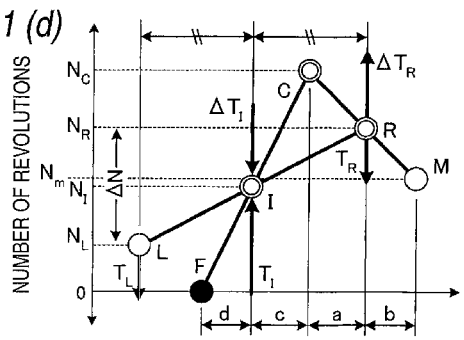

FIG. 11(a) through FIG. 11(d) are views showing torque operating on respective rotating elements in respective gear mechanisms. Also, FIG. 11(a) shows the second gear mechanism a, FIG. 11(b) shows the second gear mechanism b, FIG. 11(c) shows the first gear mechanism, and FIG. 11(d) shows the differential gear. In addition, in FIG. 11(a) through FIG. 11(d), $T_I$ denotes dynamic torque input into an input element, $T_R$ denotes the right wheel output torque, $T_L$ denotes the left wheel output torque, $T_m$ denotes motor input torque, $T_C$ denotes motor torque transmitted to the connecting element, $\Delta T_R$ denotes motor torque transmitted to the right wheel output element, and $\Delta T_I$ denotes motor torque transmitted to the input element.

From FIG. 11(a), the balance of moment of torque based on point C made into a fulcrum is expressed by the following expression.

$$a \cdot \Delta T_R = (a+b) T_m \quad (13)$$

From FIG. 11(b), the balance of moment of torque based on point R made into a fulcrum is expressed by the following expression.

$$aT_C = bT_m \quad (14)$$

From FIG. 11(c), the balance of moment of torque based on point F made into a fulcrum is expressed by the following expression.

$$d \cdot \Delta T_I = (c+d) T_C \quad (15)$$

From FIG. 11(d), the balance of the total sum of torque and the balance of moment of torque with point I made into a fulcrum are expressed by the following expression.

$$\Delta T_I + T_R + T_L = \Delta T_R + T_I \quad (16)$$

$$\Delta T_R - T_R = -T_L \quad (17)$$

Based on the expressions (13) through (17), the output torque of the right wheel output element R and the left wheel output element L may be expressed by the following expression.

$$T_R = \frac{T_I}{2} + \frac{2ad+bd-bc}{2ad} \cdot T_m \quad (18)$$

$$T_L = \frac{T_I}{2} - \frac{bd+bc}{2ad} \cdot T_m \quad (19)$$

Based on the expressions (18) and (19), the difference $\Delta T$ in torque between the left wheel and the right wheel may be expressed by the following expression.

$$\Delta T = T_R - T_L = \frac{a+b}{a} \cdot T_m \quad (20)$$

Based on the above, motor torque is input in the motor input element M in the first gear mechanism 101. The connecting element C takes a reaction force of the motor torque, and transmits the torque in the same direction as that of the torque generated by the motor 103, to the right wheel output element R. The connecting element C transmits a reaction force of the motor torque to the second gear mechanism 102.

In the second gear mechanism 102, the fixed element F takes a reaction force of the reaction force of motor torque transmitted from the connecting element C, and transmits torque, which is in the reverse direction of the torque generated by the motor 103, to the input element I.

The differential gear 100 equally distributes the torque, which is in the reverse direction of the drive torque and the torque generated by the motor 103, to the right wheel output element R and the left wheel output element L. Therefore, the torque in the same direction of the torque generated by the motor 103 is applied to the right wheel output element R, and the torque in the reverse direction of the torque generated by the motor is applied to the left wheel output element L, whereby a difference in torque is generated between the left wheel and the right wheel.

Here, a condition for making equal the magnitude of the torque movement amount, which is the design specification 5 in point 1.1, is taken into consideration. The magnitude of the torque movement amounts of the right wheel output element R and the left wheel output element L are determined by the product of the motor torque $T_m$ of the second term by the coefficients in the expressions (18) and (19), respectively. Since $T_m$ is not equal to 0 ($T_m \neq 0$) when torque moves, it is necessary that the coefficients are equal to each other in order to meet the design specification. The condition is shown by the following expression.

$$\frac{2ad + bd - bc}{2ad} = \frac{bd + bc}{2ad} \qquad (21)$$

If the expression (21) is arranged, the following expression that is the same as the expression (12) is obtained.

$$\frac{a}{b} = \frac{c}{d} \qquad (22)$$

1.2.3. Summary

The roles of the respective rotating elements are shown below based on the results of analysis described above.

The input element I, the right wheel output element R and the left wheel output element L are three rotating elements required for the differential gear 100.

It is necessary in compliance with the design specification 4 in point 1.1 that, as regards the motor input element M into which the motor torque $T_m$ is input, the number of revolutions thereof is 0 when traveling straight.

Accordingly, the motor input element M is a rotating element required to be separate from the three elements of the differential gear 100.

The motor input element M and the right wheel output element R are made into rotating elements of the first gear mechanism 101 in order to transmit the motor torque $T_m$ to the right wheel output element R. Also, the connecting element C is made into the remaining one element of the first gear mechanism 101.

The connecting element C takes a reaction force of the motor torque $T_m$, and transmits the motor torque $T_m$ to the right wheel output element R.

The first gear mechanism 101 and the second gear mechanism 102 are connected to each other via the connecting element C in order to transmit the reaction force of the motor torque $T_m$, which is taken by the connecting element C, to the second gear mechanism 102. The remaining two elements of the second gear mechanism 102 are made into the input element I and the fixed element F.

The fixed element F takes a reaction force of the reaction force of the motor torque $T_m$ transmitted by the connecting element C, and transmits the motor torque $T_m$ to the input element I. The structure becomes a structure of five elements having two rotational degrees of freedom, in which the number of revolutions of the five rotating elements is unitarily determined by the number $N_I$ of revolutions and the difference $\Delta N$ in the number of revolutions between the left wheel and the right wheel, by fixing the fixed element F.

In addition, in order to meet the design specifications 4 and 5 in point 1.1, it is necessary to meet the conditional expression a/b=c/d which is expressed by the relative ratios a, b, c and d of the number of revolutions of the respective rotating elements in two gear mechanisms. In order to meet the conditional expression, it is necessary that the relative ratios of the number of revolutions of the respective rotating elements in the two gear mechanisms are equal to each other, that is, a=c and b=d are established.

Based on the above, in one differential gear 100 and two three-element gear mechanisms having two rotational degrees of freedom, in which the relative ratios of the number of revolutions of the respective rotating elements are equal to each other, it is found that a five-element structure having two rotational degrees of freedom in which one rotating element of one gear mechanism is connected to one rotating element of the other gear mechanism, respectively, is a configuration included in the structural example of the drive force adjustment apparatus in the present examination.

1.3. Structural Classification of Drive Force Adjustment Apparatus in the Present Examination Using the velocity diagrams, all the structures in which the drive force adjustment apparatus in the present examination can be achieved are taken into consideration and are classified.

From point 1.2, it is found that, in order to compose the drive force adjustment apparatus in the present examination, one differential gear 100 and two three-element gear mechanisms having two rotational degrees of freedom in which the relative ratios of the number of revolutions of the respective rotating elements are equal to each other, are required. The rotating elements of these gear mechanisms may be defined as any one of the input element I, right wheel output element R, left wheel output element L, motor input element M, connecting element C or fixed element F, and are given necessarily sufficient roles.

Here, the respective rotating elements of respective gear mechanisms are defined as described below.

The rotating elements of the differential gear 100 are, respectively, made into input element I, right wheel output element R, and left wheel output element L.

One of the two gear mechanisms excluding the differential gear 100 is made into the first gear mechanism 101, and the other one is made into the second gear mechanism 102.

A rotating element for connecting the first gear mechanism 101 to the second gear mechanism 102 is made into connecting element C. The connecting element C becomes a rotating element for both of the first gear mechanism 101 and the second gear mechanism 102.

It is necessary that motor input element M and fixed element F become rotating elements of individual gear mechanisms. The motor input element M is made into the rotating element of the first gear mechanism, and the fixed element F is made into the element of the second gear mechanism.

The remaining one element of the first gear mechanism 101 is connected to any one of the input element I, the right wheel output element R and the left wheel output element L that are rotating elements of the differential gear 100. The rotating element is made into differential connecting element D1.

Further, the remaining one element of the second gear mechanism 102 is connected to any one of the remaining two elements other than the rotating element of the differential gear 100, which is connected to the differential connecting element D1. The rotating element is made into differential connecting element D2.

First, structures that can be taken by the first gear mechanism 101 and the second gear mechanism 102 are considered by comparing the number of revolutions of the rotating elements of the first gear mechanism 101 and the second gear mechanism 102 when traveling straight.

When traveling straight, the number of revolutions of the input element I, the right wheel output element R and the left wheel output element L, which are the rotating elements of the differential gear 100, are equal to each other and become a greater value than 0. Therefore, the differential connecting elements D1 and D2 connected to the rotating elements of the differential gear 100 are subjected to the number of revolutions equal to that of the rotating elements of the differential gear 100, and become a greater value than 0.

The number of revolutions of the motor input element M becomes 0, when traveling straight, by the design specification. Also, the number of revolutions of the fixed element F is always 0.

The number of revolutions of the connecting element C is determined by which gear the other two elements are connected in the first gear mechanism 101 and the second gear mechanism 102. Hereinafter, combinations of magnitudes that can be taken by the number of revolutions of the respective rotating elements in the first gear mechanism 101 and the second gear mechanism 102 are shown below.

"Motor input element M·Fixed element F (=0)<Differential connecting elements D1, D2<Connecting element C"

"Connecting element C<Motor input element M·Fixed element F (=0)<Differential connecting elements D1, D2"

"Motor input element·Fixed element F (=0)<Connecting element C<Differential connecting elements D1, D2"

The number of revolutions of the differential connecting elements D1 and D2 is equal to each other and becomes a greater value than 0. The number of revolutions of the motor input element M and the fixed element F are equal to each other, and become 0. Therefore, the relative ratios of the number of revolutions of the differential connecting elements D1 and D2 with respect to the connecting element C are equal to each other, and similarly, the relative ratios of the motor input element M and the fixed element F with respect to the connecting element C are equal to each other.

Figure 12:
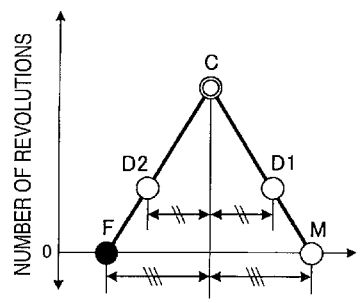
FIG. 12($a$), FIG. 12($b$) and FIG. 12($c$) are velocity diagrams that can be taken by a first three-element gear mechanism having two rotational degrees of freedom and a second three-element gear mechanism having two rotational degrees of freedom when traveling straight.
Figure 12:
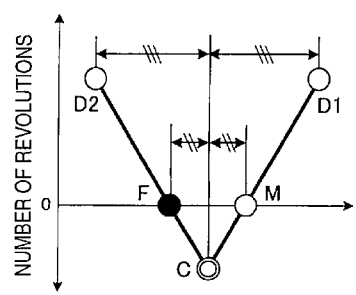
Figure 12:
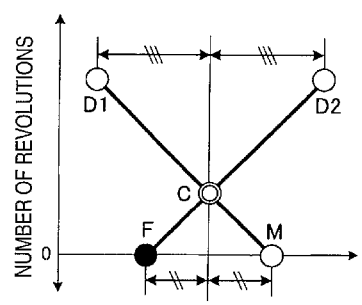

FIG. 12(a) through FIG. 12(c) are velocity diagrams that can be taken by the first gear mechanism 101 and the second gear mechanism 102 when traveling straight.

In FIG. 12(a) through FIG. 12(c), combinations of the magnitudes, which can be taken by the number of revolutions of the respective rotating elements of the first gear mechanism 101 and the second gear mechanism 102 when traveling straight, and conditions of the relative ratios of the number of revolutions of the respective rotating elements with respect to the connecting element C are met.

Here, by focusing on the relationship between the number of revolutions of the rotating element when traveling straight, the structures that can be taken by the first gear mechanism 101 and the second gear mechanism 102 can be classified. Hereinafter, the definition of the classification is shown.

The structure shown in FIG. 12(a), in which the number $N_C$ of revolutions of the connecting element C is the highest in comparison with the other rotating elements, is regarded as an A type.

The structure shown in FIG. 12(b), in which the connecting element C rotates in reverse of the rotation direction of the differential gear 100, is regarded as a V type.

The structure shown in FIG. 12(c), in which the number $N_C$ of revolutions of the connecting element C becomes slower than the rotating elements of the differential gear 100, is regarded as an X type.

Next, structures that can be taken by the first gear mechanism 101 and the second gear mechanism 102 are taken into consideration based on the combinations of connection between the differential connecting elements D1 and D2 being the rotating elements of the first gear mechanism 101 and the second gear mechanism 102 and the rotating elements of the differential gear 100.

Table 1 shows all the combinations where two elements of the differential connecting elements D1 and D2 and three elements of the differential gear 100 are connected to each other.

TABLE 1

|  | Differential connecting element 1 | Differential connecting element 2 |
|---|---|---|
| Combination 1 | Right wheel output element R | Left wheel output element L |
| Combination 2 | Left wheel output element L | Right wheel output element R |
| Combination 3 | Input element I | Right wheel output element R |
| Combination 4 | Input element I | Left wheel output element L |
| Combination 5 | Right wheel output element R | Input element I |
| Combination 6 | Left wheel output element L | Input element I |

18 types in which the A type, V type and X type belonging to the classification made by focusing on the relationship between the number of revolutions of rotating elements when traveling straight, and combinations 1 through 6, shown in Table 1, being combinations of connections between the differential gear 100, the first gear mechanism 101 and the second gear mechanism 102, are combined, are all for structures by which a drive force adjustment apparatus in the present examination can be achieved.

Figure 13:
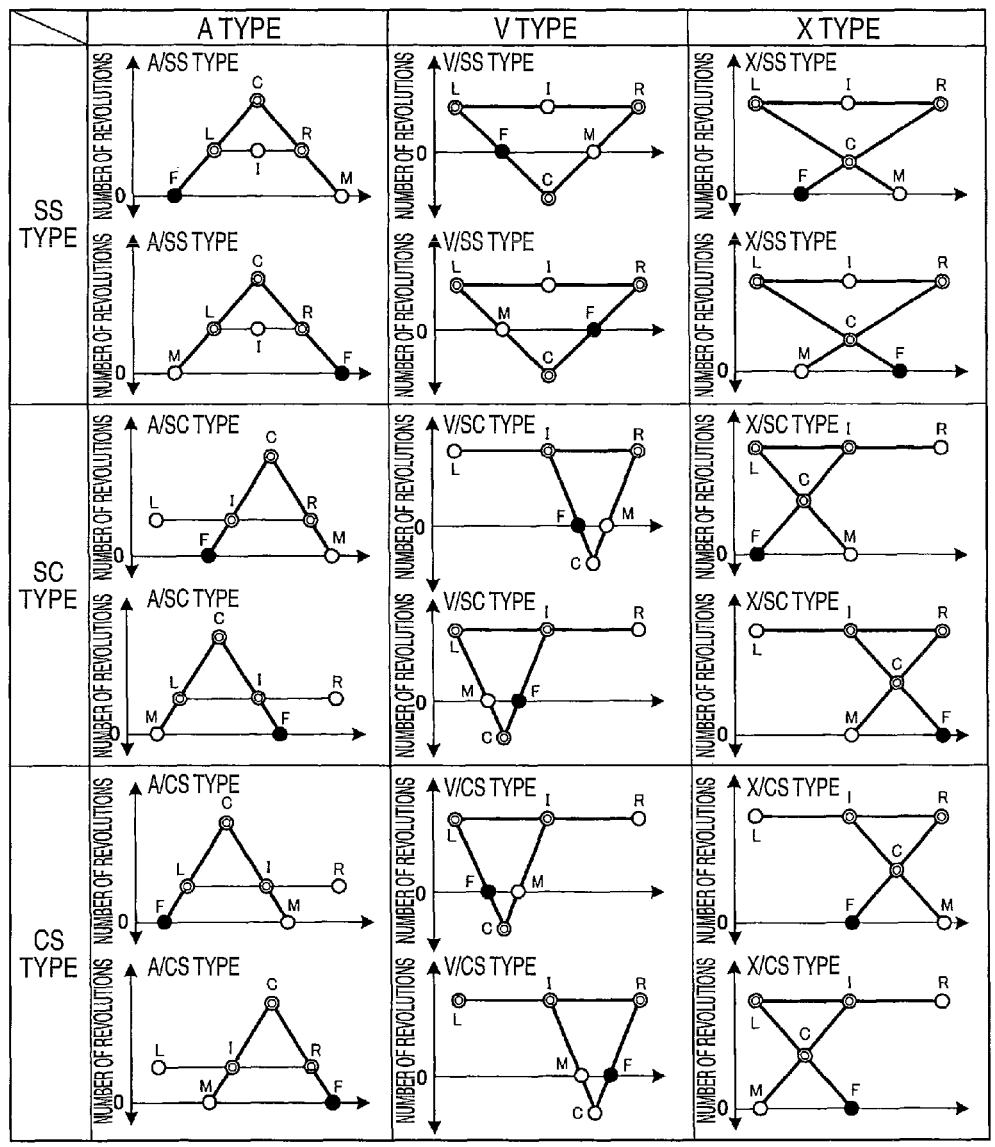
FIG. 13 is a velocity diagram of a structure in which a drive force adjustment apparatus in the present examination is established.

FIG. 13 is a velocity diagram of a structure in which a drive force adjustment apparatus in the present examination is established.

Combinations of 1 and 2, combinations of 3 and 4, and combinations of 5 and 6, which are shown in Table 1, are, respectively, in bilateral symmetry. Therefore, the six combinations shown in Table 1 may be defined as three classifications shown below.

The structure in which the differential connecting elements D1 and D2 are, respectively, connected to the right wheel output element R and the left wheel output element L is defined as the SS (Shaft-to-Shaft connection) type.

The structure in which the differential connecting element D1 and the right wheel output element R or the left wheel output element L are connected to each other, and the differential connecting element D2 and the input element I are connected to each other is defined as the SC (Shaft-to-Case connection) type.

The structure in which the differential connecting element D1 and the input element I are connected to each other, and the differential connecting element D2 and the right wheel output element R or the left wheel output element L are connected to each other is defined as the CS (Case-to-Shaft connection) type.

From the above, all the structures shown in the velocity diagram of FIG. 13, which can achieve the drive force adjustment apparatus in the present examination, can be classified into nine types based on the combinations of the A type, V type and X type belonging to the classification made by focusing on the number of revolutions of rotating elements when traveling straight, and the SS type, SC type and CS type belonging to the classification made by focusing on connections of the first gear mechanism 101, the second gear mechanism 102 and the differential gear 100.

In addition, in the structural example of the drive force adjustment apparatus used in point 1.2, the number $N_C$ of revolutions of the connecting element C is the highest when traveling straight. Also, the first gear mechanism 101 having the motor input element M contained therein is connected to the right wheel output element R, and the second gear mechanism 102 having the fixed element F contained therein is connected to the input element I. Therefore, the structural example of the drive force adjustment apparatus used in point 1.2 is classified into the A/SC type.

2. Consideration of Characteristics of the Drive Force Adjustment Apparatus in the Present Examination 2.1. Number of Revolutions and Torque in Respective Structures Where a difference in torque between the left wheel and the right wheel is ΔT, the relationship between the torque movement amount ΔT/2 to each of the right wheel and the left wheel and the motor torque $T_m$ is assumed to be as in the following expression.

$$\Delta T/2 = G \cdot T_m \quad (23)$$

Here, system gain G means the amplification ratio of the motor torque $T_m$ to the torque movement amount ΔT.

Where the expression (23) is established in a state where the gear ratios between the input element I and the right wheel output element R and between the input element I and the left wheel output element L in the differential gear 100 is 1 to 1, the velocity diagram that expresses the relative ratio of the number of revolutions between the rotating elements by using the system gain G is taken into consideration.

Here, a velocity diagram of the A/SS type is taken into consideration as one example.

Figure 14:
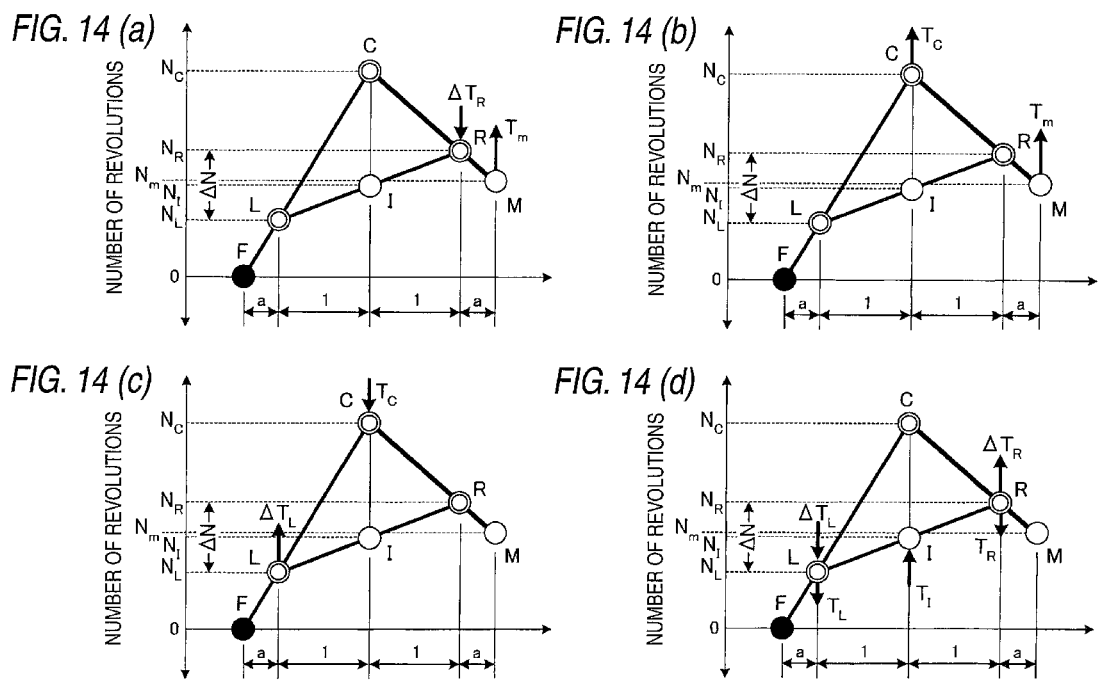
FIG. 14($a$), FIG. 14($b$), FIG. 14($c$) and FIG. 14($d$) are velocity diagrams of an A/SS type.

FIG. 14(a) through FIG. 14(d) are velocity diagrams of the A/SS type. Also, FIG. 14(a) is a diagram showing torque $\Delta T_R$ acting on the right wheel output element R in the first gear mechanism, FIG. 14(b) is a diagram showing torque $T_C$ acting on the connecting element of the first gear mechanism, FIG. 14(c) is a diagram showing the second gear mechanism, and FIG. 14(d) is a diagram showing the differential gear.

In FIG. 14(a) through FIG. 14(d), the relationship regarding torque in the respective gear mechanisms is shown under the assumption that the relative ratio of the number of revolutions of the right wheel output element R and the motor input element M, and the left wheel output element L and the fixed element F is a.

Also, Table 2 shows a list of symbols used in the velocity diagrams shown in FIG. 14(a) through FIG. 14(d).

TABLE 2

| Item | Number of revolutions | Torque |
|---|---|---|
| Input element I | $N_I$ | $T_I$ |
| Right wheel output element R | $N_R$ | $T_R$ |
| Left wheel output element L | $N_L$ | $T_L$ |
| Motor input element M | $N_m$ | $T_m$ |
| Connecting element C | $N_C$ | $T_C$ |
| Torque movement amount $\Delta T_R$ to right wheel | — | $\Delta T_R$ |
| Torque movement amount $\Delta T_L$ to left wheel | — | $\Delta T_L$ |

From FIG. 14(a), the balance of moment of torque centering around point C is expressed by the following expression.

$$\Delta T_R = (a+1) \cdot T_m \quad (24)$$

From FIG. 14(b), the balance of moment of torque centering around point R is expressed by the following expression.

$$T_C = aT_m \quad (25)$$

From FIG. 14(c), the balance of moment of torque centering around point F is expressed by the following expression.

$$a \cdot \Delta T_L = (a+1) \cdot T_C \quad (26)$$

From FIG. 14(d), the balance of the total sum of torque and the balance of moment of torque centering around point I are expressed by the following expressions.

$$T_R + \Delta T_L + T_L = T_I + \Delta T_R \quad (27)$$

$$T_R - \Delta T_R = T_L + \Delta T_L \quad (28)$$

Based on the expressions (24) through (28), the torque applied to the right wheel output element R and the left wheel output element L may be an expression by the following expressions.

$$T_R = T_I/2 + (a+1) \cdot T_m \quad (29)$$

$$T_L = T_I/2 - (a+1) \cdot T_m \quad (30)$$

Based on the expressions (29) and (30), the torque $T_R$ of the right wheel is increased and the torque $T_L$ of the left wheel is decreased by the motor output. That is, it is found that the torque is moving by the motor output. In addition, the difference ΔT between the left wheel and the right wheel may be expressed by the following expression.

$$\Delta T = T_R - T_L = 2(a+1) \cdot T_m \quad (31)$$

The following expression is obtained by the expressions (23) and (31) expressing the torque movement amount ΔT.

$$2(a+1) \cdot T_m = 2G \cdot T_m \quad (32)$$

By arranging the above expression, the ratio α of the number of revolutions may be expressed by the following expression.

$$a = G - 1 \quad (33)$$

Figure 15:
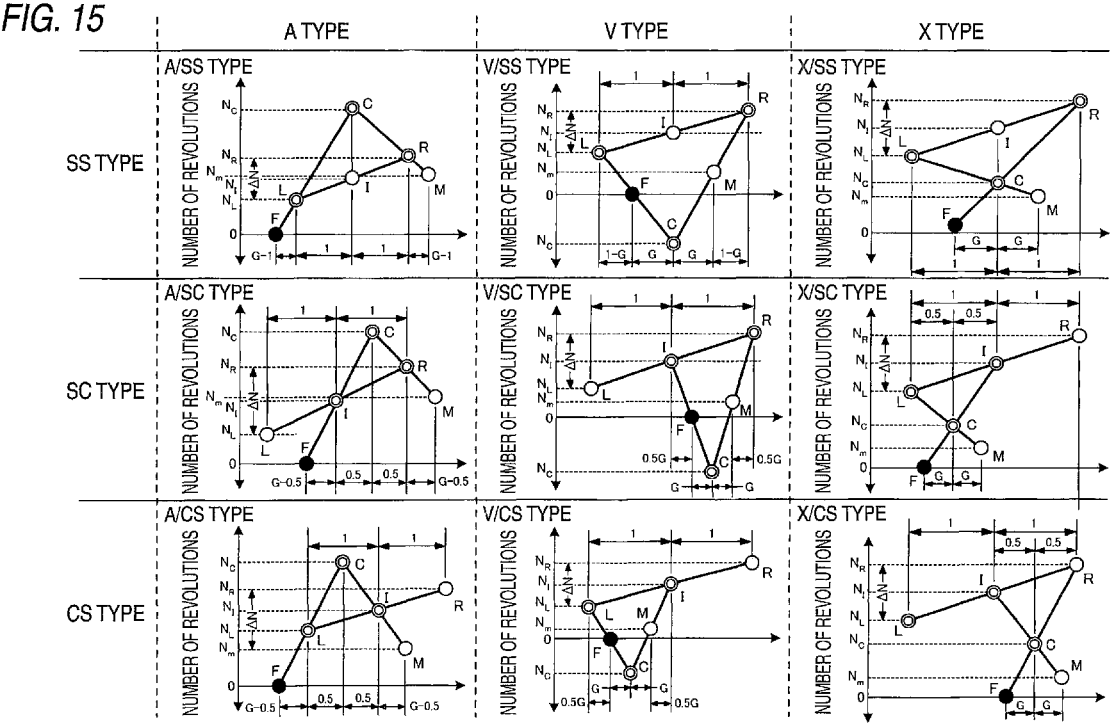
FIG. 15 is a view showing velocity diagrams of respective structures.

FIG. 15 is a view showing velocity diagrams of respective structures.

FIG. 15 is a velocity diagram expressing the ratio a of the number of revolutions by system gain G by calculating the structures other than the A/SS type as in the above.

Based on FIG. 15, the relationship between the difference ΔN in the number of revolutions between the right wheel and the left wheel and the number $N_m$ of revolutions of the motor in the A/SS type is obtained.

The number $N_C$ of revolutions of the connecting element C may be expressed by the following expressions based on the relationship between the number of revolutions of respective elements in the first gear mechanism 101 and the second gear mechanism 102.

$$N_c = \frac{1}{G-1}(N_R - N_m) + N_R \quad (34)$$

$$N_c = \frac{G}{G-1} N_L \quad (35)$$

By deleting the number $N_C$ of revolutions from the expressions (34) and (35), the following expression is obtained.

$$\frac{1}{G-1}(N_R - N_m) + N_R = \frac{G}{G-1} N_L \quad (36)$$

The following expression is obtained by arranging the expression (36).

$$N_m = G \cdot (N_R - N_L) \quad (37)$$

Since the difference in the number of revolutions between the right wheel output element R and the left wheel output element L may be expressed by $\Delta N$, the expression (37) may be expressed by the following expression.

$$N_m = G \cdot \Delta N \quad (38)$$

Based on the above, the number $N_m$ of revolutions of the motor is proportionate to the system gain G and the difference $\Delta N$ in the number of revolutions between the left wheel and the right wheel. And, the relationship can be established in all the structures.

2.2. Normalization of the Number of Revolutions of Respective Rotating Elements

To simplify the comparison of the number of revolutions of the respective rotating elements, the respective number of revolutions in the velocity diagram is normalized by the input number $N_I$ of revolutions.

Also, the value obtained by normalizing the difference between the input number $N_I$ of revolutions and the number $N_R$ of revolutions of the right wheel is assumed to be S.

$$S = (N_R - N_I)/N_I \quad (39)$$

Since S is a difference in the number of revolutions between the case 140 of the differential gear 100 and the wheels, S becomes the same value as $\Delta N/(2N_m)$, and the number $N_m$ of revolutions of the motor may be expressed by the following expression.

$$N_m/N_I = G \cdot 2S \quad (40)$$

The number of revolutions of the respective rotating elements of the differential gear 100 may be expressed by the following expressions.

$$N_I/N_I = 1 \quad (41)$$

$$N_R/N_I = 1 + S \quad (42)$$

$$N_L/N_I = 1 - S \quad (43)$$

Here, in order to obtain the number $N_C/N_I$ of revolutions, which is obtained by normalizing the connecting element C of the A/SS type, the following expression is obtained by normalizing the expression (35) by the input number $N_I$ of revolutions.

$$N_C/N_I = \frac{G}{G-1} \cdot N_L/N_I \quad (44)$$

The following expression is obtained by substituting the expression (43) into the expression (44).

$$N_C/N_I = \frac{G}{G-1} \cdot (1 - S) \quad (45)$$

The structures other than the A/SS type calculate the number $N_C$ of revolutions of the connecting element C normalized as in the above. Table 3 shows the number $N_C$ of revolutions of the connecting element C normalized in the respective structures.

TABLE 3

| | A type | V type | X type |
|---|---|---|---|
| SS type | $\frac{G}{G-1} \cdot (1-S)$ | $\frac{-G}{1-G} \cdot (1-S)$ | $\frac{G}{G+1} \cdot (1+S)$ |
| SC type | $\frac{2G}{2G-1}$ | $\frac{-2G}{1-2G}$ | $\frac{2G}{2G+1}$ |
| CS type | $\frac{2G}{2G-1} \cdot (1-S)$ | $\frac{-2G}{1-2G} \cdot (1-S)$ | $\frac{2G}{2G+1} \cdot (1+S)$ |

Based on the above, if the number of revolutions of respective elements is normalized by the input number $N_I$ of revolutions in the respective structures, the respective number of revolutions may be expressed by the system gain G and S.

Figure 16:
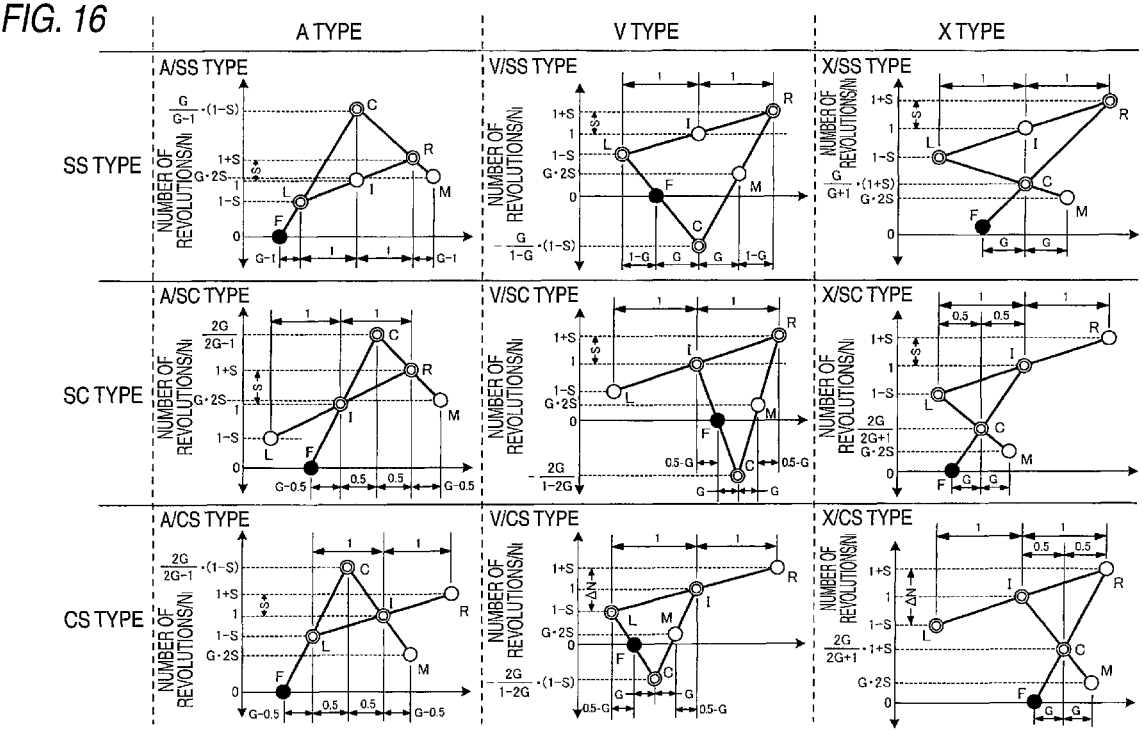
FIG. 16 is a velocity diagram in which the number of revolutions of respective rotating elements is normalized.

FIG. 16 is a velocity diagram in which the number of revolutions of respective rotating elements is normalized by $N_I$.

2.3. Comparison of Characteristics in Respective Structures

In order to clarify differences in the respective structures, the characteristics of the following items are compared with each other.

Consumption energy of motor

Range that can be taken by the system gain G

Number of revolutions of rotating elements 2.3.1. Comparison of Consumption Energies of Motor The consumption energy P of the motor 103 is obtained by the product of the motor torque $T_m$ by the number $N_m$ of revolutions of the motor based on the expressions (1) and (14).

$$P = T_m \cdot N_m = \frac{1}{2} \Delta T \cdot \Delta N \quad (46)$$

Therefore, it is found that the consumption energy P of the motor 103 is determined by values of a difference $\Delta T$ in torque and a difference $\Delta N$ in the number of revolutions between the left wheel and the right wheel regardless of the system gain G and the structure.

2.3.2. Range that Can be Taken by the System Gain G

Table 4 shows the range that can be taken by the system gain G of the respective structures.

TABLE 4

| Structure | Range of system gain G |
|---|---|
| A/SS type | G > 1 |
| A/SC type, A/CS type | G > 0.5 |
| V/SS type | 0 < G < 1 |

TABLE 4-continued

| Structure | Range of system gain G |
|---|---|
| V/SC type, V/CS type | 0 < G < 0.5 |
| X/SS type, X/SC type, X/CS type | G > 0 |

2.3.3 Comparison of the Number of Revolutions of Rotating Elements

The input element $N_I$, the right wheel output element $N_R$ and the left wheel output element $N_L$ being the rotating elements of the differential gear 100 are expressed by the expressions (17) through (19) and have no difference depending on the structures.

Since the number $N_m$ of revolutions of the motor is proportionate to S and the system gain G based on the expression (16), the number $N_m$ of revolutions of the motor has no difference resulting from the difference in structure where the system gains G in the respective structures are equal to each other.

The number $N_C$ of revolutions of the connecting element C becomes a different value as in Table 3 based on differences in the structures.

Figure 17:
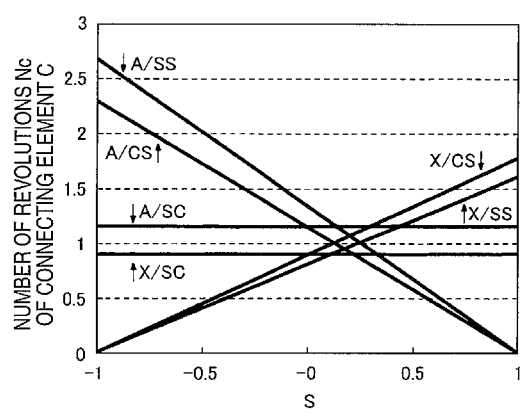
FIG. 17($a$) and FIG. 17($b$) are views showing results of comparison of the number of revolutions regarding respective connecting elements where the system gain is fixed.
Figure 17:
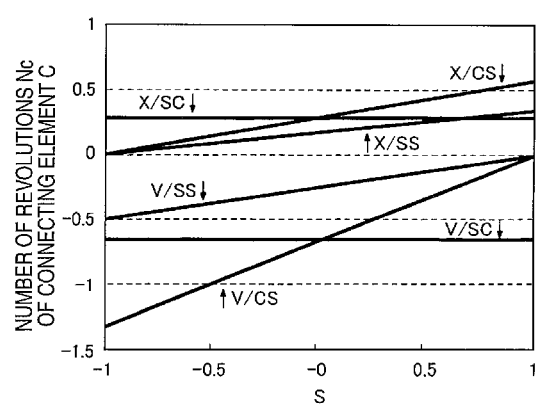

FIG. 17(a) and FIG. 17(b) are views showing the results of comparison of the number $N_C$ of revolutions regarding the respective connecting elements C where the system gain G is fixed. Also, in FIG. 17(a), the system gain G is equal to 4 (G=4), and in FIG. 17(b), the system gain G is equal to 0.2 (G=0.2).

Based on FIG. 17(a) and FIG. 17(b), it is found that, when the system gain G is fixed, the number $N_C$ of revolutions becomes fixed in the SC type regardless of S. On the contrary, it is found that, in SS type and CS type, the number $N_C$ of revolutions increases in proportion to S.

2.3.4. Summary

Table 5 shows a list of comparison characteristics of respective structures.

TABLE 5

| Structure | Range of G | Characteristic expression of $N_c$ | S = −1 | S = 0 | S = 1 |
|---|---|---|---|---|---|
| A/SS type | G > 1 | $\frac{G}{G-1} \cdot (1-S)$ | | $\frac{2G}{G-1}$ | $\frac{G}{G-1}$ | 0 |
| A/SC type | G > 0.5 | $\frac{2G}{2G-1}$ | | $\frac{2G}{2G-1}$ | |
| A/CS type | G > 0.5 | $\frac{2G}{2G-1} \cdot (1-S)$ | | $\frac{4G}{2G-1}$ | $\frac{2G}{2G-1}$ | 0 |
| V/SS type | 0 < G < 1 | $\frac{-G}{1-G} \cdot (1-S)$ | | $\frac{-2G}{1-G}$ | $\frac{-G}{1-G}$ | 0 |
| V/SC type | 0 < G < 0.5 | $\frac{-2G}{1-2G}$ | | $\frac{-2G}{1-2G}$ | |
| V/CS type | 0 < G < 0.5 | $\frac{-2G}{1-2G} \cdot (1-S)$ | | $\frac{-4G}{1-2G}$ | $\frac{-2G}{1-2G}$ | 0 |
| X/SS type | G > 0 | $\frac{G}{G+1} \cdot (1+S)$ | 0 | $\frac{G}{G+1}$ | $\frac{2G}{G+1}$ |
| X/SC type | G > 0 | $\frac{2G}{2G+1}$ | | $\frac{2G}{2G+1}$ | |
| X/CS type | G > 0 | $\frac{2G}{2G-1} \cdot (1-S)$ | 0 | $\frac{2G}{2G+1}$ | $\frac{4G}{2G+1}$ |

First, the ranges of system gain G are compared.

As shown in Table 5, the system gain G of the V/SS type becomes less than 1, the system gain G of the V/SC type and V/CS type becomes less than 0.5. Therefore, since a motor 103 that outputs torque equal to or exceeding at least half of a desired difference in torque is required where the V type is applied, a large-sized motor becomes necessary.

On the contrary, the system gain G of the A/SS type becomes a value greater than 1, and the system gain G of the A/SC type and the A/CS type becomes a value greater than 0.5. In addition, the system gain G of the X type becomes a value greater than 0. Therefore, since the system gain G can be set to a value greater than 1, it is possible to use a motor 103 capable of generating a smaller maximum torque than a desired difference in torque between the left wheel and the right wheel, wherein the motor 103 can be small-sized, and it is possible to attempt to lighten the weight of the drive force adjustment apparatus.

Next, the number $N_C$ of revolutions of the connecting element C is compared.

As shown in Table 5, in the SS type and CS type, the number of revolutions of the connecting element C increases and decreases when turning. Accordingly, where the SS type and CS type are applied, the traveling resistance changes when turning, wherein there is a fear that the traveling characteristics change. On the contrary, since, in the SC type, the number of revolutions of the connecting element C is kept fixed when turning, the traveling resistance does not change, and the traveling characteristics do not change. In particular, since the number $N_C$ of revolutions is always a positive value in the A/SC type and X/SC type, the first carrier 130 and the second carrier 131 always rotate in the same rotation direction with respect to the case 140 and the output shaft of the differential gear 100, wherein the agitation resistance in the interior of the casing of the drive force adjustment apparatus can be lowered to reduce the traveling load.

Embodiment 1

Hereinafter, a description is given of Embodiment 1 of the drive force adjustment apparatus according to the present invention.

Based on the result of the above-described examination, the drive force adjustment apparatus according to the present embodiment has been configured so as to achieve the A/SC type that is capable of taking a greater value than 1 for the system gain G and in which the number $N_c$ of revolutions is fixed and always takes a positive value.

FIG. 1 is a skeleton diagram of a drive force adjustment apparatus according to Embodiment 1.

As shown in FIG. 1, a differential gear 1 is provided with a left and right wheel drive force adjustment mechanism 2 capable of adjusting a drive force distribution transmitted to the left wheel and the right wheel. In the present embodiment, the differential gear 1 uses a bevel gear type differential apparatus according to the related arts.

The differential gear 1 is provided with left and right side gears 10, 11, and differential pinion gears 12, 13 in the interior of the case 15 of the differential gear 1, and has an input gear 14 on the outer circumferential surface of the case 15. The left and right side gears 10, 11 are opposed to each other, and are provided on the same axis as that of the input gear 14. The input gear 14 is meshed with an output gear 90 provided at the end part of a propeller shaft 9.

The differential pinion gears 12 and 13 are provided between the left and right side gears 10 and 11, and at the same time, the differential pinion gears 12 and 13 are supported on the input gear 14 so as to self-rotate. And, the left drive shaft 20 is connected to the left side gear 10, and the right drive shaft 21 is connected to the right side gear 11.

And, when traveling straight, the left and right side gears 10, 11 and the differential pinion gears 12, 13 rotate integrally with each other without making relative rotations, and when turning, the respective gears self-rotate and absorb differences in the number of revolutions between the left and right drive shafts 20, 21.

Further, the left and right wheel drive force adjustment mechanism 2 is composed of the first and the second three-element gear mechanisms 3, 4 having two rotational degrees of freedom, which are disposed and juxtaposed to each other, and a motor 5. Any one of the first and the second three-element gear mechanisms 3, 4, having two rotational degrees of freedom, and the motor 5 is disposed coaxially with the rotation axis (that is, the rotation center axis of the input gear 14) of the differential gear 1.

The three-element gear mechanism 3 having two rotational degrees of freedom, which is disposed at the right wheel side, includes the first sun gear 30 connected to the right drive shaft 21, a plurality of the first planetary gears 31 provided around the first sun gear 30 and meshed with the first sun gear 30, a plurality of the second planetary gears 32 rotating integrally with the first planetary gears 31, the first carrier 34 rotatably and pivotally supporting the first and the second planetary gears 31, 32, and the second sun gear 33 coaxially provided with the first sun gear 30 and meshed with the second planetary gears 32.

The second sun gear 33 is formed to be integral with a hollow shaft (a motor rotation shaft) 8 connected to a rotor (a rotating piece) 50 of the motor 5. Also, the right drive shaft 21 is disposed coaxially with the hollow shaft 8 in the interior thereof.

The motor 5 is disposed in the axle direction (the vehicle width direction) of the first and the second three-element gear mechanisms 3 and 4 having two rotational degrees of freedom, and in the present embodiment a stator (a fixed piece) 51 is arranged on the outer circumferential side, and the rotor 50 is arranged inside the stator 51. Also, it may be configured that the rotor 50 is arranged on the outer circumferential side and the stator 51 is arranged inwardly.

The second three-element gear mechanism 4 having two rotational degrees of freedom, which is disposed at the left wheel side, includes the third sun gear 40 connected to the input gear 14 of the differential gear 1, a plurality of the third planetary gears 41 provided around the third sun gear 40 and meshed with the third sun gear 40, a plurality of the fourth planetary gears 42 provided coaxially with the third planetary gear 41 and rotating integrally with the third planetary gears 41, the second carrier 44 for rotatably and pivotally supporting the third and the fourth planetary gears 41, 42 and simultaneously formed to be integral with the first carrier 34, and the fourth sun gear 43 provided coaxially with the third sun gear 40, meshed with the fourth planetary gears 42 and fixed on the casing 6 for accommodating the first and the second three-element gear mechanisms 3, 4 having two rotational degrees of freedom.

The third sun gear 40 and the input gear 14 of the differential gear 1 are connected to each other via the hollow shaft 7, wherein the third sun gear 40 and the input gear 14 of the differential gear 1 are configured so as to rotate integrally with each other. A right drive shaft 21 connected to the side gear 11 of the differential gear 1 is disposed in the interior of the hollow shafts 7, 8, and the drive shaft 21 is disposed coaxially with the hollow shafts 7, 8.

In the present embodiment, the first sun gear 30 and the third sun gear 40 are formed so that the number of teeth thereof becomes equal to each other. Also, the first planetary gear 31 and the third planetary gear 41 are formed so that the number of teeth thereof becomes equal to each other. Further, the second sun gear 33 and the fourth sun gear 43 are formed so that the number of teeth thereof becomes equal to each other. In addition, the second planetary gear 32 and the fourth planetary gear 42 are formed so that the number of teeth thereof becomes equal to each other.

Also, the first and the third sun gears 30, 40 are formed so that the number of teeth thereof becomes greater than those of the second and the fourth sun gears 33, 43. Further, the first and the third planetary gears 31, 41 are formed so that the number of teeth thereof becomes smaller than those of the second and the fourth planetary gears 32, 42.

Based on the above-described configuration, in the drive force adjustment apparatus according to the present embodiment, by controlling actuation of the motor 5 in compliance with the traveling states of a vehicle, it is possible to increase or decrease the drive torque of one wheel by appropriately varying the state of drive force distribution (torque distribution) between the left wheel and the right wheel.

Next, a description is given of actions of the drive force adjustment apparatus according to the present embodiment.

Figure 2:
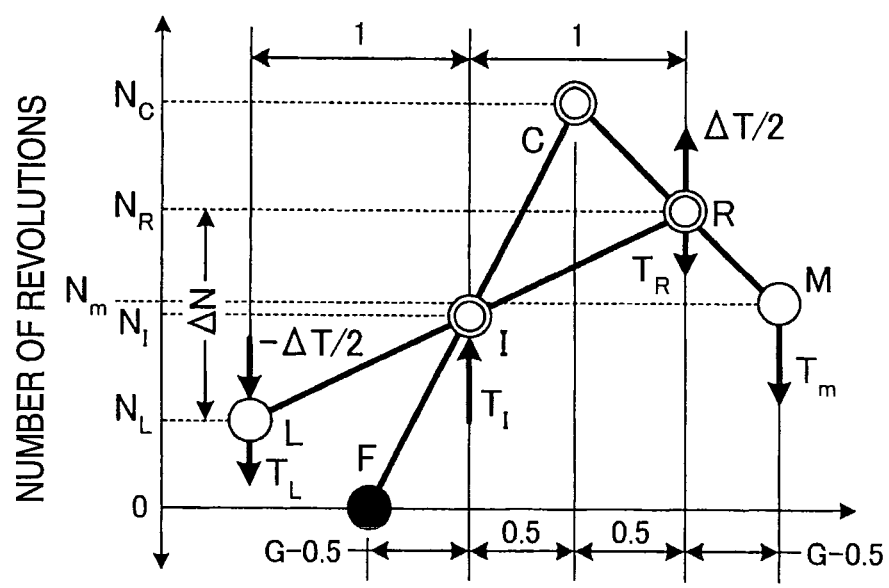
FIG. 2 is a velocity diagram of the drive force adjustment apparatus according to Embodiment 1.

FIG. 2 is a velocity diagram of the drive force adjustment apparatus according to Embodiment 1.

The number $N_C$ of revolutions of the connecting element C shown in FIG. 2 may be expressed by the following expressions.

$$N_C = \frac{2G}{2G-1} \cdot N_i \quad (47)$$

$$G = \frac{\Delta T}{2T_m} \quad (48)$$

Here, $\Delta T$ means a difference in torque between the left and right drive shafts 20, 21, $T_m$ means motor torque, and $N_i$ means the number of revolutions of the case 15 of the differential gear 1.

With the drive force adjustment apparatus according to the present embodiment, since the number $N_C$ of revolutions of the connecting element C always becomes a positive value by the expression (47), the connecting element C always rotates in the same direction as the case 15 of the differential gear 1 and the hollow shaft 7, wherein the agitation resistance can be reduced. Therefore, the traveling load can be reduced.

Also, with the drive force adjustment apparatus disclosed in JP-A-2007-177916, the drive force adjustment apparatus is the V/SC type, the number $N_C$ of revolutions of the connecting element C always becomes a negative value. Therefore, the connecting element C always rotates in reverse of the rotation direction of the case 15 of the differential gear 1 and the hollow shaft 7. So, the agitation resistance is increased to accordingly increase the traveling load.

Further, with the drive force adjustment apparatus according to the present embodiment, as shown in Table 5, in the case of the A/SC type drive force adjustment apparatus, since the range that the system gain G of the motor torque $T_m$ can take becomes G>0.5, the system gain G can be set to 1 or more. Therefore, since a motor 5 that can generate a smaller maximum torque than the desired difference in torque between the left wheel and the right wheel can be used, the motor 5 can be small-sized, and it is possible to lighten the weight of the drive force adjustment apparatus.

Further, with the drive force adjustment apparatus disclosed in JP-A-2007-177916, the drive force adjustment apparatus is the V/SC type, and thus, the range that the system gain G of the motor torque $T_m$ can take becomes $0<G<0.5$. Therefore, since it is necessary that the motor 5 capable of generating a maximum torque two times or more than the desired difference in torque between the left wheel and the right wheel is used, the motor 5 is large-sized, and the weight of the drive force adjustment apparatus is resultantly increased.

Embodiment 2

Hereinafter, a description is given of Embodiment 2 of the drive force adjustment apparatus according to the present invention.

The drive force adjustment apparatus according to the present embodiment differs from the drive force adjustment apparatus according to Embodiment 1 in that a motor 5 is installed sideways of the left and right wheel drive force adjustment mechanism 2 in the front and rear direction of a vehicle. Also, the configuration thereof other than the above-described point is the same as that of the drive force adjustment apparatus according to Embodiment 1.

Figure 3:
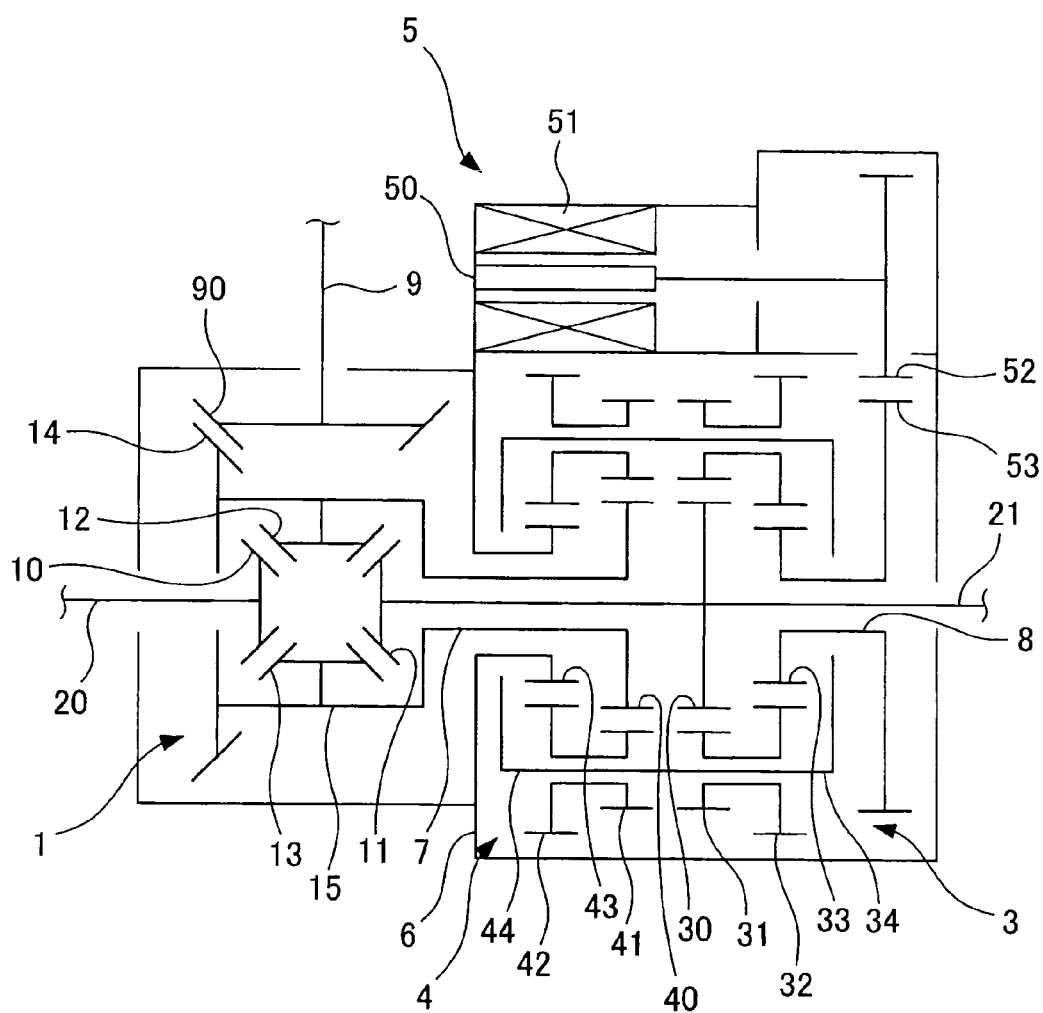
FIG. 3 is a skeleton diagram of a drive force adjustment apparatus according to Embodiment 2.

FIG. 3 is a skeleton diagram of the drive force adjustment apparatus according to Embodiment 2.

As shown in FIG. 3, in the drive force adjustment apparatus according to the present embodiment, the motor 5 is installed sideways of the left and right wheel drive force adjustment mechanism 2 in the front and rear direction of a vehicle, a gear 52 is installed on the output shaft of the rotor 50, and a gear meshed with the gear 52 is installed on the outer circumferential side of the hollow shaft 8, wherein the motor 5 and the left and right wheel drive force adjustment mechanism 2 are connected to each other.

With the drive force adjustment mechanism according to the present embodiment, since the size of the drive force adjustment apparatus in the vehicle width direction can be reduced, the drive force adjustment mechanism according to the present embodiment can be incorporated even in a vehicle not having allowance to install the motor 5 in the vehicle width direction as in the drive force adjustment apparatus according to Embodiment 1.

Embodiment 3

Hereinafter, a description is given of Embodiment 3 of the drive force adjustment apparatus according to the present invention.

The drive force adjustment apparatus according to the present embodiment differs from the drive force adjustment apparatus according to Embodiment 1 in that the motor 5 is installed at the left wheel side.

Figure 4:
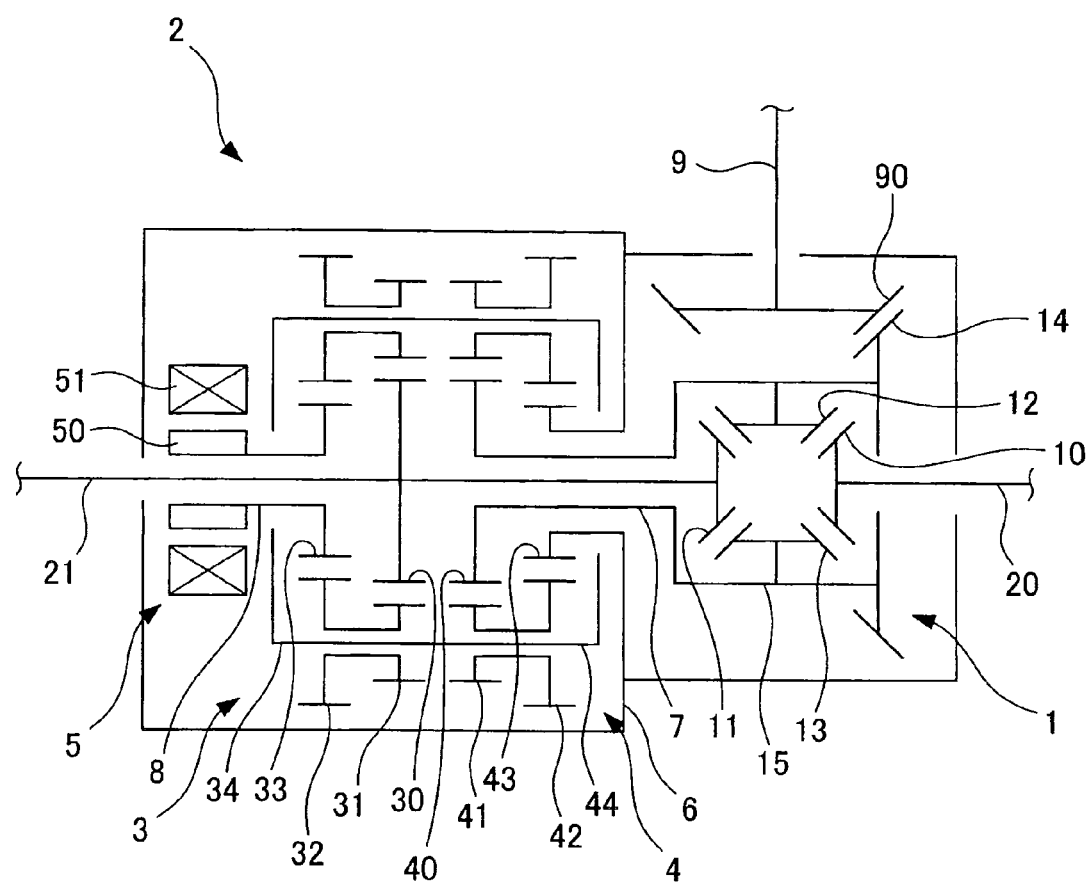
FIG. 4 is a skeleton diagram of a drive force adjustment apparatus according to Embodiment 3.

FIG. 4 is a skeleton diagram of the drive force adjustment apparatus according to Embodiment 3.

As shown in FIG. 4, in the drive force adjustment apparatus according to the present embodiment, the motor 5 is installed at the left wheel side opposite to the configuration of the drive force adjustment apparatus according to Embodiment 1.

Figure 5:
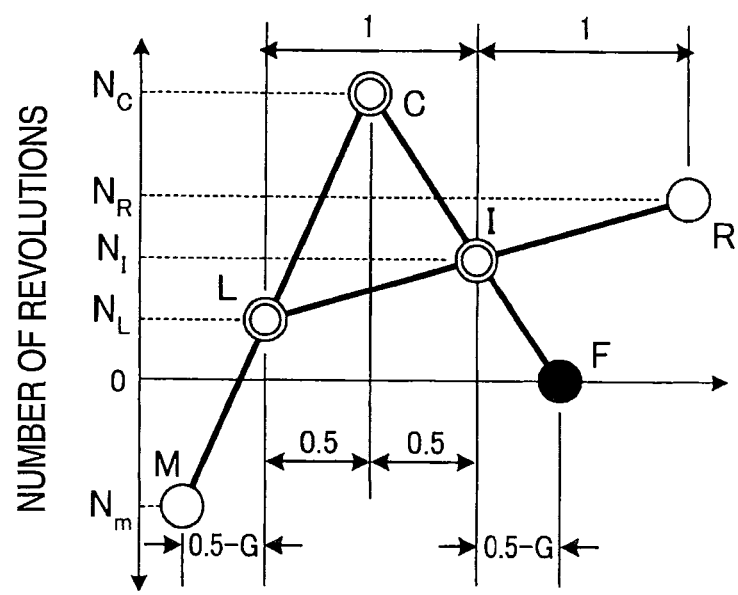
FIG. 5 is a velocity diagram of the drive force adjustment apparatus according to Embodiment 3.

FIG. 5 is a velocity diagram of the drive force adjustment apparatus according to Embodiment 3.

The velocity diagram of the drive force adjustment apparatus according to the present embodiment becomes a velocity diagram shown in FIG. 5 in order to install the motor 5 at the left wheel side opposite to the configuration of the drive force adjustment apparatus according to Embodiment 1. Therefore, by appropriately selecting the drive force adjustment apparatus according to the present embodiment or the drive force adjustment apparatus according to Embodiment 1, it becomes possible to incorporate a drive force adjustment apparatus in compliance with the shape of a vehicle.

Embodiment 4

Hereinafter, a description is given of Embodiment 4 of the drive force adjustment apparatus according to the present invention.

Based on the result of the above-described examination, the drive force adjustment apparatus according to the present embodiment has been configured so as to achieve the A/SC type that is capable of taking a greater value than 1 for the system gain G and in which the number $N_C$ of revolutions is fixed and always takes a positive value. Also, the configuration of the drive force adjustment apparatus according to the present embodiment is the same as that of the drive force adjustment apparatus according to Embodiment 1 except for the configuration of the left and right wheel drive force adjustment mechanism 2.

Figure 6:
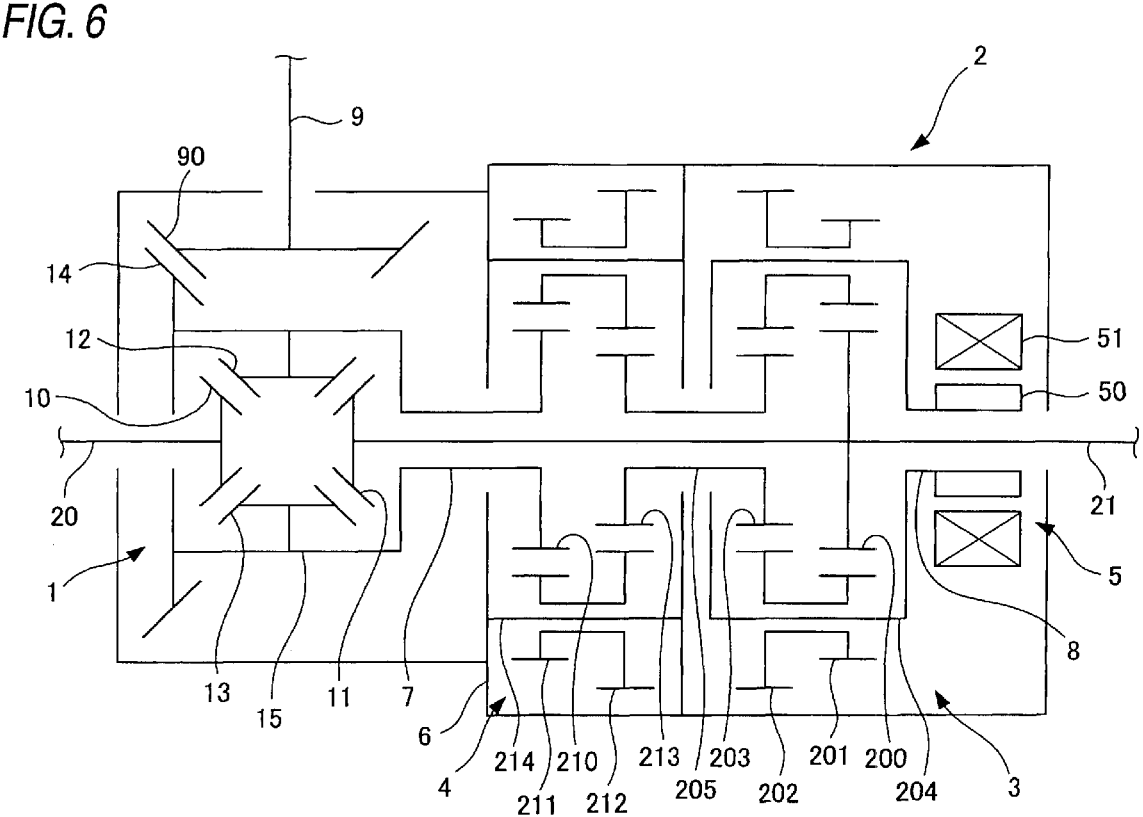
FIG. 6 is a skeleton diagram of a drive force adjustment apparatus according to Embodiment 4.

FIG. 6 is a skeleton diagram of the drive force adjustment apparatus according to Embodiment 4.

As shown in FIG. 6, the left and right wheel drive force adjustment mechanism 2 of the drive force adjustment apparatus according to the present embodiment is composed of the first and the second three-element gear mechanisms 3, 4 having two rotational degrees of freedom, which are disposed and juxtaposed to each other, and a motor 5. Any one of the first and the second three-element gear mechanisms 3, 4, having two rotational degrees of freedom, and the motor 5 is disposed coaxially with the rotation axis (that is, the rotation center axis of the input gear 14) of the differential gear 1.

The three-element gear mechanism 3 having two rotational degrees of freedom, which is disposed at the right wheel side, includes the first sun gear 200 connected to the right drive shaft 21, a plurality of the first planetary gears 201 provided around the first sun gear 200 and meshed with the first sun gear 200, a plurality of the second planetary gears 202 rotating integrally with the first planetary gears 201, the first carrier 204 rotatably and pivotally supporting the first and the second planetary gears 201, 202, and the second sun gear 203 provided coaxially with the first sun gear 200 and meshed with the second planetary gears 202.

The first carrier 204 is formed to be integral with the hollow shaft (the motor rotation shaft) 8 connected to the rotor (the rotating piece) 50 of the motor 5. Also, the right drive shaft 21 is coaxially disposed in the interior of the hollow shaft 8.

The motor 5 is arranged in the axle direction (the vehicle width direction) of the first and the second three-element gear mechanisms 3, 4 having two rotational degrees of freedom, and in the present embodiment, a stator (a fixed piece) 51 is arranged on the outer circumferential side and the rotor 50 is arranged inside the stator 51. Also, it may be configured that the rotor 50 is arranged on the outer circumferential side and the stator 51 is arranged inwardly.

The three-element gear mechanism 4 having two rotational degrees of freedom, which is disposed at the left wheel side, includes the third sun gear 210 connected to the input gear 14 of the differential gear 1, a plurality of the third planetary gears 211 provided around the third sun gear 210 and meshed with the third sun gear 210, a plurality of the fourth planetary gears 212 provided coaxially with the third planetary gears 211 and rotating integrally with the third planetary gears 211, the second carrier 214 rotatably and pivotally supporting the third and the fourth planetary gears 211, 212 and simultaneously formed to be integral with the casing 6, and the fourth sun gear 213 provided coaxially with the third sun gear 210 and meshed with the fourth planetary gears 212.

The second sun gear 203 and the fourth sun gear 213 are connected to each other via the hollow shaft 205. Therefore, the second sun gear 203 and the fourth sun gear 213 rotate integrally with each other. The third sun gear 210 and the input gear 14 of the differential gear 1 are connected to each other via the hollow shaft 7, wherein the third sun gear 210 and the input gear 14 of the differential gear 1 rotate integrally with each other. The right drive shaft 21 connected to the side gear 11 of the differential gear 1 is disposed in the interior of the hollow shafts 7, 8 and 205, and the drive shaft 21 is disposed coaxially with the hollow shafts 7, 8 and 205.

In the present embodiment, the first sun gear 200 and the third sun gear 210 are formed so that the number of teeth thereof becomes equal to each other. Also, the first planetary gear 201 and the third planetary gear 211 are formed so that the number of teeth thereof becomes equal to each other. Further, the second sun gear 203 and the fourth sun gear 213 are formed so that the number of teeth thereof becomes equal to each other. In addition, the second planetary gear 202 and the fourth planetary gear 212 are formed so that the number of teeth thereof becomes equal to each other.

Also, the first and the third sun gears 200, 210 are formed so that the number of teeth thereof becomes greater than those of the second and the fourth sun gears 203, 213. Further, the first and the third planetary gears 201, 211 are formed so that the number of teeth thereof becomes smaller than those of the second and the fourth planetary gears 202, 212.

That is, in the present embodiment, the ratios of the number of teeth between the first and the third planetary gears 201, 211 and the first and the third sun gears 200, 210 are set to be smaller than the ratios of the number of teeth between the second and the fourth planetary gears 202, 212 and the second and the fourth sun gears 203, 213.

Based on the above-described configuration, in the drive force adjustment apparatus according to the present embodiment, by controlling actuation of the motor 5 in compliance with the traveling states of a vehicle, it is possible to increase or decrease the drive torque of one wheel by appropriately varying the state of the drive force distribution (the torque distribution) between the left wheel and the right wheel. And, the drive force adjustment apparatus according to the present embodiment brings about the actions and effects which are similar to those of the drive force adjustment apparatus according to Embodiment 1.

Embodiment 5

Hereinafter, a description is given of Embodiment 5 of the drive force adjustment apparatus according to the present invention.

Based on the result of the above-described examination, the drive force adjustment apparatus according to the present embodiment has been configured so as to achieve the A/SC type that is capable of taking a greater value than 1 for the system gain G and in which the number $N_C$ of revolutions is fixed and always takes a positive value. Also, the configuration of the drive force adjustment apparatus according to the present embodiment is the same as that of the drive force adjustment apparatus according to Embodiment 1 except for the configuration of the left and right wheel drive force adjustment mechanism 2.

Figure 7:
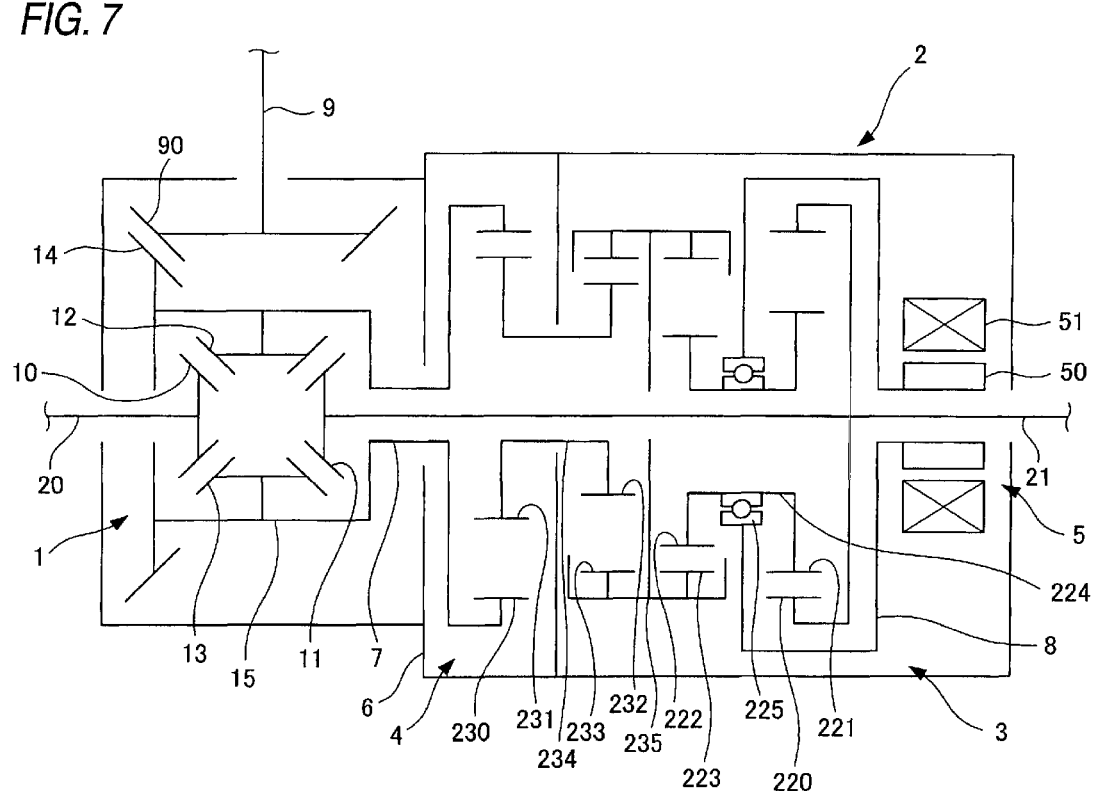
FIG. 7 is a skeleton diagram of a drive force adjustment apparatus according to Embodiment 5.

FIG. 7 is a skeleton diagram of the drive force adjustment apparatus according to Embodiment 5.

As shown in FIG. 7, the left and right wheel drive force adjustment mechanism 2 of the drive force adjustment apparatus according to the present embodiment is composed of the first and the second three-element gear mechanisms 3, 4 having two rotational degrees of freedom, which are disposed and juxtaposed to each other, and a motor 5.

The three-element gear mechanism 3 having two rotational degrees of freedom, which is disposed at the right wheel side, includes the first inner-tooth gear 220 connected to the right drive shaft 21, the first outer-tooth gear 221 provided inside the first inner-tooth gear 220 and meshed with the first inner-tooth gear 220, the second outer-tooth gear 222 connected to the first outer-tooth gear 221 via the hollow shaft 224 and rotating integrally therewith, and the second inner-tooth gear 223 provided outside the second outer-tooth gear 222 and meshed with the second outer-tooth gear 222.

A bearing 225 is installed on the outer circumferential side of the hollow shaft 224. A hollow shaft (a motor rotation shaft) 8 connected to the rotor (the rotating piece) 50 of the motor 5 is connected to the outside of the bearing 225. That is, the hollow shaft 224 and the hollow shaft 8 are connected to each other via the bearing 225. And, in the interior of the hollow shaft 8, the right drive shaft 21 and the first inner-tooth gear 220 are coaxially disposed, and the first outer-tooth gear 221 and the hollow shaft 224 are eccentrically disposed.

The motor 5 is disposed in the axle direction (the vehicle width direction) of the first and the second three-element gear mechanisms 3, 4 having two rotational degrees of freedom, and in the present embodiment, a stator (a fixed piece) 51 is arranged on the outer circumferential side, and a rotor 50 is arranged inside the stator 51. Also, it may be configured that the rotor 50 is arranged on the outer circumferential side and the stator 51 is arranged inwardly.

The three-element gear mechanism 4 having two rotational degrees of freedom, which is disposed at the left wheel side, includes the third inner-tooth gear 230 connected to the input gear 14 of the differential gear 1, the third outer-tooth gear 231 provided inside the third inner-tooth gear 230 and meshed with the third inner-tooth gear 230, the fourth outer-tooth gear 232 connected to the third outer-tooth gear 231 via the hollow shaft 234 and rotating integrally therewith, and the fourth inner-tooth gear 233 provided outside the fourth outer-tooth gear 232 and meshed with the fourth outer-tooth gear 232.

The second inner-tooth gear 223 and the fourth inner-tooth gear 233 are connected to each other via a hollow cylinder 235, wherein the second inner-tooth gear 223 and the fourth inner-tooth gear 233 are configured so as to rotate integrally with each other. The third inner-tooth gear 230 and the input gear 14 of the differential gear 1 are connected to each other via the hollow shaft 7, wherein the third inner-tooth gear 230 and the input gear 14 of the differential gear 1 are configured so as to rotate integrally with each other.

The right drive shaft 21 connected to the side gear 11 of the differential gear 1 is disposed in the interior of the hollow shafts 7, 8, 224, 234 and the hollow cylinder 235, and the drive shaft 21 is disposed coaxially with the hollow shafts 7, 8 and the hollow cylinder 235. Also, the hollow shafts 224, 234 are eccentrically disposed with respect to the drive shaft 21.

In the present embodiment, the first inner-tooth gear 220 and the third inner-tooth gear 230 are formed so that the number of teeth thereof becomes equal to each other. Also, the first outer-tooth gear 221 and the third outer-teeth gear 231 are formed so that the number of teeth thereof becomes equal to each other. Further, the second inner-tooth gear 223 and the fourth inner-tooth gear 233 are formed so that the number of teeth thereof becomes equal to each other. In addition, the second outer-tooth gear 222 and the fourth outer-teeth gear 232 are formed so that the number of teeth thereof becomes equal to each other.

Also, the first and the third inner-tooth gears 220, 230 are formed so that the number of teeth thereof becomes greater than those of the second and the fourth inner-tooth gears 223, 233. Further, the first and the third outer-tooth gears 221, 231 are formed so that the number of teeth thereof becomes smaller than those of the second and the fourth outer-tooth gears 222, 232.

That is, in the present embodiment, the ratios of the number of teeth between the first and the third inner-tooth gears 220, 230 and the first and the third outer-tooth gears 221, 231 are set to be smaller than the ratios of the number of teeth between the second and the fourth inner-tooth gears 223, 233 and the second and the fourth outer-tooth gears 222 and 232.

Based on the above-described configuration, in the drive force adjustment apparatus according to the present embodiment, by controlling actuation of the motor 5 in compliance with the traveling states of a vehicle, it is possible to increase or decrease the drive torque of one wheel by appropriately varying the state of the drive force distribution (the torque distribution) between the left wheel and the right wheel. And, the drive force adjustment apparatus according to the present embodiment brings about the actions and effects which are similar to those of the drive force adjustment apparatus according to Embodiment 1.

Embodiment 6

Hereinafter, a description is given of Embodiment 6 of the drive force adjustment apparatus according to the present invention.

Based on the result of the above-described examination, the drive force adjustment apparatus according to the present embodiment has been configured so as to achieve the A/SC type that is capable of taking a greater value than 1 for the system gain G and in which the number $N_C$ of revolutions is fixed and always takes a positive value. Also, the configuration of the drive force adjustment apparatus according to the present embodiment is the same as that of the drive force adjustment apparatus according to Embodiment 1 except for the configuration of the left and right wheel drive force adjustment mechanism 2.

Figure 8:
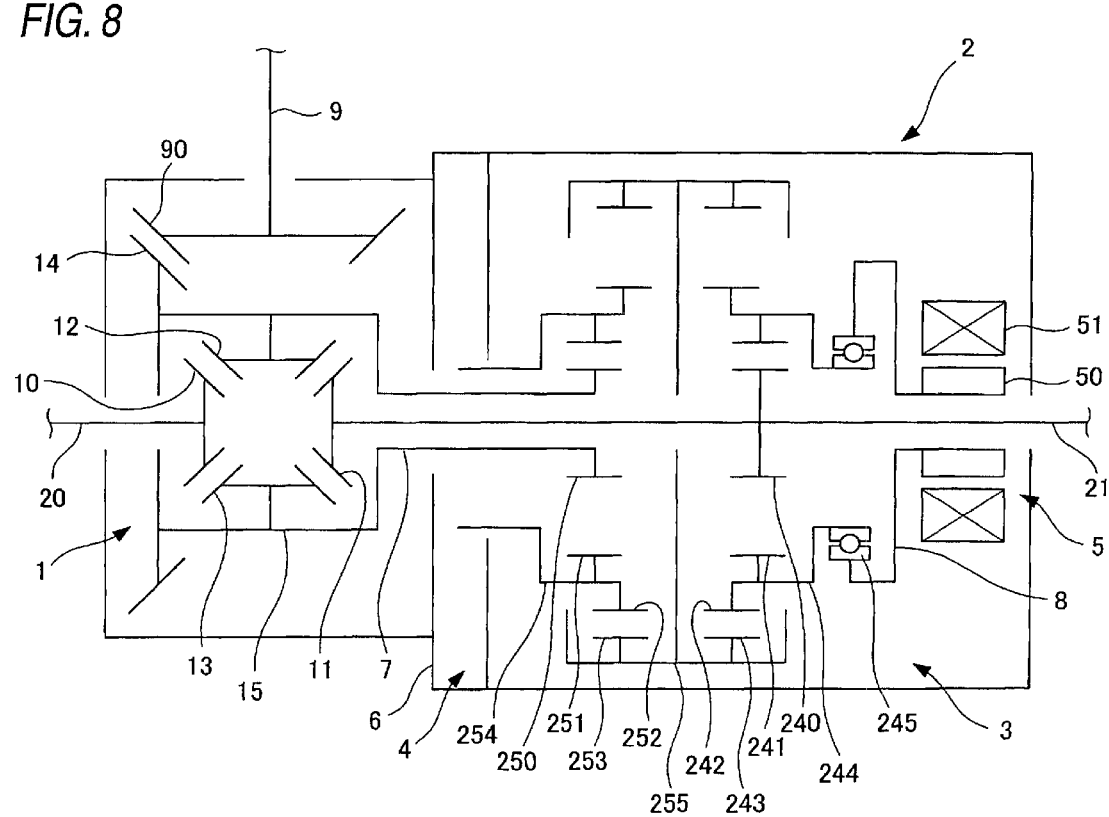
FIG. 8 is a skeleton diagram of a drive force adjustment apparatus according to Embodiment 6.

FIG. 8 is a skeleton diagram of the drive force adjustment apparatus according to Embodiment 6.

As shown in FIG. 8, the left and right wheel drive force adjustment mechanism 2 in the drive force adjustment apparatus according to the present embodiment is composed of the first and the second three-element gear mechanisms 3, 4 having two rotational degrees of freedom, which are disposed and juxtaposed to each other, and a motor 5.

The three-element gear mechanism 3 having two rotational degrees of freedom, which is disposed at the right wheel side, includes the first outer-tooth gear 240 connected to the right drive shaft 21, the first inner-tooth gear 241 provided outside the first outer-tooth gear 240 and meshed with the first outer-tooth gear 240, the second outer-tooth gear 242 connected to the first inner-tooth gear 241 via the hollow shaft 244 and rotating integrally therewith, and the second inner-tooth gear 243 provided outside the second outer-tooth gear 242 and meshed with the second outer-tooth gear 242. And, in the present embodiment, the first inner-tooth gear 241 is provided on the inner circumferential side of the hollow shaft 244, and the second outer-tooth gear 242 is provided on the outer circumferential side of the hollow shaft 244.

A bearing 245 is provided on the outer circumferential side at the right wheel side end part of the hollow shaft 244. The hollow shaft (the motor rotation shaft) 8 connected to the rotor (the rotating piece) 50 of the motor 5 is connected to the outside of the bearing 245. That is, the hollow shaft 244 and the hollow shaft 8 are connected to each other via the bearing 245. And, the right drive shaft 21 is coaxially disposed in the interior of the hollow shaft 8, and the hollow shaft 244 is eccentrically disposed therein.

The motor 5 is disposed in the axle direction (the vehicle width direction) of the first and the second three-element gear mechanisms 3, 4 having two rotational degrees of freedom, in the present embodiment, a stator (a fixed piece) 51 is arranged on the outer circumferential side, and a rotor 50 is arranged inside the stator 51. Also, it may be configured that the rotor 50 is arranged on the outer circumferential side, and the stator 51 is arranged inwardly.

The three-element gear mechanism 4 having two rotational degrees of freedom, which is disposed at the left wheel side, includes the third outer-tooth gear 250 connected to the input gear 14 of the differential gear 1, the third inner-tooth gear 251 provided outside the third outer-tooth gear 250 and meshed with the third outer-tooth gear 250, the fourth outer-tooth gear 252 connected to the third inner-tooth gear 251 via the hollow shaft 254 and rotating integrally therewith, and the fourth inner-tooth gear 253 provided outside the fourth outer-tooth gear 252 and meshed with the fourth outer-tooth gear 252. And, in the present embodiment, the third inner-tooth gear 251 is provided on the inner circumferential side of the hollow shaft 254, and the fourth outer-tooth gear 252 is provided on the outer circumferential side of the hollow shaft 254.

The second inner-tooth gear 243 and the fourth inner-tooth gear 253 are connected to each other via the hollow cylinder 255, wherein the second inner-tooth gear 243 and the fourth inner-tooth gear 253 rotate integrally with each other. The third inner-tooth gear 250 and the input gear 14 of the differential gear 1 are connected to each other via the hollow shaft 7, wherein the third inner-tooth gear 250 and the input gear 14 of the differential gear 1 rotate integrally with each other.

The right drive shaft 21 connected to the side gear 11 of the differential gear 1 is disposed in the interior of the hollow shafts 7, 8, 244, 254 and the hollow cylinder 255, and the drive shaft 21 is disposed coaxially with the hollow shafts 7, 8 and the hollow cylinder 255. In addition, the hollow shafts 244, 254 are eccentrically disposed with respect to the drive shaft 21.

In the present embodiment, the first outer-tooth gear 240 and the third outer-tooth gear 250 are formed so that the number of teeth thereof becomes equal to each other. Also, the first inner-tooth gear 241 and the third inner-teeth gear 251 are formed so that the number of teeth thereof becomes equal to each other. Further, the second inner-tooth gear 243 and the fourth inner-tooth gear 253 are formed so that the number of teeth thereof becomes equal to each other. In addition, the second outer-tooth gear 242 and the fourth outer-teeth gear 252 are formed so that the number of teeth thereof becomes equal to each other.

Also, the first and the third outer-tooth gears 240, 250 are formed so that the number of teeth thereof becomes smaller than those of the second and the fourth inner-tooth gears 243, 253. Further, the first and the third inner-tooth gears 241, 251 are formed so that the number of teeth thereof becomes smaller than those of the second and the fourth outer-tooth gears 242, 252.

That is, in the present embodiment, the ratios of the number of teeth between the first and the third inner-tooth gears 241, 251 and the first and the third outer-tooth gears 240, 250 are set to be larger than the ratios of the number of teeth between the second and the fourth inner-tooth gears 243, 253 and the second and the fourth outer-tooth gears 242 and 252.

Based on the above-described configuration, in the drive force adjustment apparatus according to the present embodiment, by controlling actuation of the motor 5 in compliance with the traveling states of a vehicle, it is possible to increase or decrease the drive torque of one wheel by appropriately varying the state of the drive force distribution (the torque distribution) between the left wheel and the right wheel. And, the drive force adjustment apparatus according to the present embodiment brings about the actions and effects which are similar to those of the drive force adjustment apparatus according to Embodiment 1.

Also, in the above description of the embodiments of the present invention, the drive force adjustment apparatus for adjusting the drive forces of the left and right wheels of a vehicle was described as an example for reference. However, the present invention is not limited to adjustment of the drive forces of the left and right wheels, wherein the left and right wheels can be regarded as the front and rear wheels, and the present invention is applicable as a drive force adjustment apparatus for adjusting the drive forces of the front and rear wheels of a vehicle.

The respective embodiments described above are proposed for description of one example of a configuration that meets the requirements of the drive force adjustment apparatus according to the present invention. Such a configuration that meets the requirements of the drive force adjustment apparatus according to the present invention can be achieved even in a three-element gear mechanism having two rotational degrees of freedom other than the above embodiments.

As has been described above, the drive force adjustment apparatus according to the present invention includes a differential gear 1, into which a drive force is input from a drive source, for absorbing a difference in the number of revolutions between two output shafts, one motor 5 serving as an actuator for generating a difference in torque between the output shafts of the differential gear 1, and a drive force adjustment mechanism between two output shafts, which is provided with the first three-element gear mechanism 3 and the second three-element gear mechanism 4 each having two rotational degrees of freedom, which increase or decrease the torque of the first output shaft (the right wheel side output shaft in Embodiments 1 through 4) of the differential gear 1, and decrease or increase the torque of the same magnitude at the second output shaft (the left wheel side output shaft in Embodiments 1 through 4) of the differential gear 1 by applying torque by means of the motor 5, wherein a drive force adjustment apparatus between two output shafts, in which the number of revolutions of the motor 5 is 0 when traveling straight, is configured so that an element for connecting a rotating element into which torque of the differential gear 1 is input and one rotating element of the second three-element gear mechanism 4 having two rotational degrees of freedom to each other is made into an input element I, a rotating element of the first output shaft of the differential gear 1 is made into the first output element R, and a rotating element of the second output shaft is made into the second output element L, any one of the first output element R and the second output element L is connected to one rotating element of the first three-element gear mechanism 3 having two rotational degrees of freedom, an element for connecting one rotating element of the first three-element gear mechanism 3 having two rotational degrees of freedom and the motor 5 to each other is made into a motor input element M, an element, in which the number of revolutions becomes 0, for connecting one rotating element of the second three-element gear mechanism 4 having two rotational degrees of freedom and the casing 6 to each other is made into a fixed element F, an element for connecting one rotating element of the first three-element gear mechanism 3 having two rotational degrees of freedom and one rotating element of the second three-element gear mechanism 4 having two rotational degrees of freedom to each other is made into a connecting element C, and where the respective elements are expressed as points on a graph the ordinate of which shows the number of revolutions and the abscissa of which shows the relative ratios of the number of revolutions of the respective elements, a velocity diagram is achieved in which the lengths of L-I and R-I are equal to each other, and L-I-R, F-I-C and C-R-M are linearly connected to each other in order or L-I-R, M-L-C and C-I-F are linearly connected to each other in order, and further wherein since the number $N_C$ of revolutions of the connecting element C always becomes a positive value, the connecting element C always rotates in the same direction as the case 15 of the differential gear 1 and the hollow shaft 7. Therefore, the agitation resistance can be reduced, and the traveling load can be also reduced.

Further, since the drive force adjustment apparatus according to the present invention is an A/SC type drive force adjustment apparatus, as shown in Table 5, the range that the system gain G can take of the motor torque $T_m$ becomes G>0.5. Therefore, the system gain G can be set to 1 or more. Accordingly, a motor 5 that is capable of generating a smaller maximum torque than a desired difference in torque between the left wheel and the right wheel can be used, the motor 5 can be small-sized, and it is possible to lighten the weight of the drive force adjustment apparatus.

According to the present invention, it is possible to provide a drive force adjustment apparatus that can use a motor capable of generating a smaller maximum torque than a desired difference in torque between two output shafts of a differential gear.

The present invention is applicable to, for example, a drive force adjustment apparatus for adjusting the drive forces of the left and right wheels and the front and rear wheels of a vehicle.

What is claimed is:

1. A drive force adjustment apparatus comprising:
a differential gear, into which a drive force is input from a drive source, the differential gear configured to absorb a difference in the number of revolutions between two output shafts;
a motor configured to generate a difference in torque between the output shafts, wherein the number of revolutions of the motor is 0 when a vehicle travels straight; and
a first gear mechanism and a second gear mechanism, which increase or decrease torque of one of the output shafts by a magnitude and decrease or increase torque of the other of the output shafts by the magnitude, the first gear mechanism including a first rotating element, a second rotating element and a third rotating element, the second gear mechanism including a fourth rotating element, a fifth rotating element and a sixth rotating element,
wherein
an element that is connected to a rotating element into which torque of the differential gear is input and the fourth rotating element of the second gear mechanism is an input element, a rotating element of one of the output shafts is a first output element, a rotating element of the other of the output shafts is a second output element, and one of the first output element and the second output element is connected to the first rotating element of the first gear mechanism, an element that is connected to the second rotating element of the first gear mechanism and the motor is a motor input element, an element that is connected to the fifth rotating element of the second gear mechanism and a casing is a fixed element, the number of revolutions of which is 0, an element that is connected to the third rotating element of the first gear mechanism and the sixth rotating element of the second gear mechanism is a connecting element, wherein the first gear mechanism includes:
- a first sun gear, which is the first rotating element, connected to one of the output shafts;
- a first planetary gear provided around the first sun gear and meshed with the first sun gear;
- a second planetary gear provided coaxially with the first planetary gear and rotating integrally with the first planetary gear;
- a first carrier, which is the third rotating element, rotatably and pivotally supporting the first planetary gear and the second planetary gear; and
- a second sun gear, which is the second rotating element, provided coaxially with the first sun gear, meshed with the second planetary gear and connected to a rotation shaft of the motor, and the second gear mechanism includes:
- a third sun gear, which is the fourth rotating element, connected to a case of the differential gear;
- a third planetary gear provided around the third sun gear and meshed with the third sun gear;
- a fourth planetary gear provided coaxially with the third planetary gear and rotating integrally with the third planetary gear;
- a second carrier, which is the sixth rotating element, rotatably and pivotally supporting the third planetary gear and the fourth planetary gear and formed to be integral with the first carrier;
- a fourth sun gear, which is the fifth rotating element, provided coaxially with the third sun gear, meshed with the fourth planetary gear, and fixed on the casing, wherein the number of teeth of the first sun gear and the number of teeth of the third sun gear are equal to each other, the number of teeth of the first planetary gear and the number of teeth of the third planetary gear are equal to each other, the number of teeth of the second sun gear and the number of teeth of the fourth sun gear are equal to each other, and the number of teeth of the second planetary gear and the number of teeth of the fourth planetary gear are equal to each other, ratio of the number of teeth of the first sun gear to the number of teeth of the first planetary gear is smaller than ratio of the number of teeth of the second sun gear to the number of teeth of the second planetary gear, and ratio of the number of teeth of the third sun gear to the number of teeth of the third planetary gear is smaller than ratio of the number of teeth of the fourth sun gear to the number of teeth of the fourth planetary gear, and wherein a rotating speed (Nc) of the connecting element is determined by following formulas:

$$N_c = \frac{2G}{2G-1} \cdot N_i$$
$$G = \frac{\Delta T}{2T_m}$$

where (G) indicates a system gain, (Ni) indicates number of revolutions of the differential gear, (ΔT) indicates a difference in torque between the two drive shafts, and (Tm) indicates a motor torque, such that the rotating speed of the connecting element always assume a positive value and a rotating direction of the connecting element is always the same as a rotating direction of the rotating element into which torque of the differential gear is input.

* * * * *